US009595137B2

(12) United States Patent
Sharma et al.

(10) Patent No.: US 9,595,137 B2
(45) Date of Patent: Mar. 14, 2017

(54) AUGMENTED REALITY COMPUTING DEVICE, APPARATUS AND SYSTEM

(75) Inventors: Sameer Sharma, Santa Clara, CA (US); Tzu Pin Chao, Taipei (TW); Yen Chiu Hsu, Taipei (TW); Andrew S. Marsee, Queen Creek, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 240 days.

(21) Appl. No.: 13/976,973

(22) PCT Filed: Apr. 26, 2012

(86) PCT No.: PCT/US2012/035265
§ 371 (c)(1),
(2), (4) Date: Jun. 27, 2013

(87) PCT Pub. No.: WO2013/162583
PCT Pub. Date: Oct. 31, 2013

(65) Prior Publication Data
US 2014/0104316 A1    Apr. 17, 2014

(51) Int. Cl.
*G09G 5/00*    (2006.01)
*G06T 19/00*    (2011.01)
(Continued)

(52) U.S. Cl.
CPC .......... *G06T 19/006* (2013.01); *G06F 1/1626* (2013.01); *G06F 1/1637* (2013.01); *G06F 3/011* (2013.01); *G09G 2340/12* (2013.01)

(58) Field of Classification Search
CPC .............................. G06T 15/20; G06T 19/006
See application file for complete search history.

(56) References Cited

U.S. PATENT DOCUMENTS 8,624,797 B2 *  1/2014  Lee et al. ........................... 345/4
8,646,000 B2 *  2/2014  Kang et al. ...................... 725/39
(Continued)

FOREIGN PATENT DOCUMENTS

EP          1847963 A1    10/2007
JP    WO 2011070871 A1 *  6/2011   ........... G06T 19/006
(Continued)

OTHER PUBLICATIONS

International Search Report and Written Opinion, Mailed Date: Jan. 2, 2013, Application No. PCT/US2012/035265, Filed Date: Apr. 26, 2012, pp. 10.
(Continued)

*Primary Examiner* — Charles Tseng

(57) ABSTRACT

Embodiments of an apparatus and system are described for an augmented reality computing device. Some embodiments may comprise an enclosure comprising a display portion and a component portion, the display portion arranged to support a transparent display and the component portion arranged to support a processor and an augmented reality module operative on the processor to display one or more graphical user interface elements on the transparent display and to arrange the one or more graphical user interface elements based on one or more elements in a real world environment in proximity to the computing device. Other embodiments are described and claimed.

24 Claims, 18 Drawing Sheets

(51) Int. Cl.
*G06F 1/16* (2006.01)
*G06F 3/01* (2006.01)

(56) References Cited

U.S. PATENT DOCUMENTS

| | | | |
|---|---|---|---|
| 9,007,277 B2* | 4/2015 | Fleck | 345/1.1 |
| 2008/0071559 A1* | 3/2008 | Arrasvuori | G06Q 30/06 705/26.1 |
| 2009/0128449 A1 | 5/2009 | Brown et al. | |
| 2010/0277421 A1 | 11/2010 | Charlier et al. | |
| 2011/0187743 A1 | 8/2011 | Hwang et al. | |
| 2011/0285622 A1* | 11/2011 | Marti et al. | 345/158 |
| 2012/0098806 A1* | 4/2012 | Samadani et al. | 345/207 |
| 2012/0105487 A1* | 5/2012 | Son et al. | 345/671 |
| 2012/0127161 A1* | 5/2012 | Wallbom et al. | 345/419 |
| 2012/0230581 A1* | 9/2012 | Miyashita | G06T 19/006 382/154 |
| 2013/0207896 A1* | 8/2013 | Robinson et al. | 345/158 |

FOREIGN PATENT DOCUMENTS

| | | |
|---|---|---|
| TW | M401140 | 4/2011 |
| WO | 2012049674 A2 | 4/2012 |

OTHER PUBLICATIONS

Office action and Search Report received for Taiwanese Patent Application No. 102114405, mailed Oct. 30, 2014, 11 pages including 5 pages English translation.

\* cited by examiner

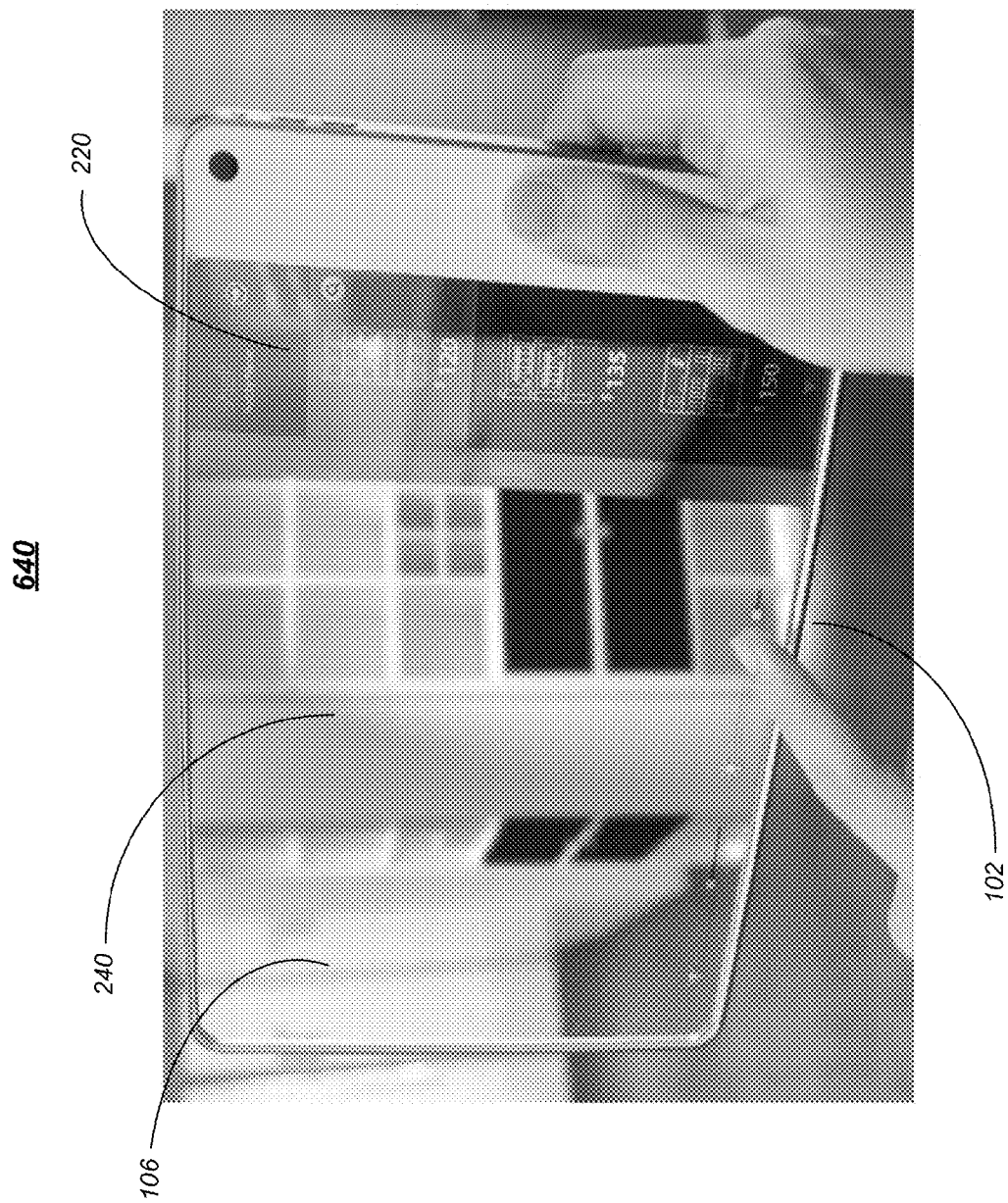

DETERMINE A LOCATION OF A COMPUTING DEVICE, THE LOCATION ASSOCIATED WITH A REAL WORLD ENVIRONMENT
1002

DISPLAY ONE OR MORE GRAPHICAL USER INTERFACE ELEMENTS ON A TRANSPARENT DISPLAY OF THE COMPUTING DEVICE
1004

ARRANG THE ONE OR MORE GRAPHICAL USER INTERFACE ELEMENTS BASED ON ONE OR MORE ELEMENTS IN THE REAL WORLD ENVIRONMENT
1006

AUGMENTED REALITY COMPUTING DEVICE, APPARATUS AND SYSTEM

BACKGROUND

The performance and capabilities of modern computing systems have increased rapidly in recent years. Many computing systems today include one or more processors, memory, wireless connectivity, displays and other components requiring electrical power. The number and type of capabilities and components in modern computing systems continue to increase while the systems continue to decrease in size, resulting in limited space for the different components necessary to implement the increased capabilities and diverse usage scenarios. Moreover, modern mobile computing systems are often used in a variety of different locations and usage scenarios which require ergonomically designed systems capable of offering standard computing functionality in addition to advanced options for displaying and interacting with information and graphical user interfaces to ensure a satisfactory and dynamic user experience. For example, modern computing systems may offer augmented reality features that enable users to dynamically interact with a real world environment, however, the interaction is generally limited to interaction with a digital representation of the real world environment. As a result, it is desirable to improve mobile computing device designs. Consequently, there exists a substantial need for techniques to adapt mobile computing devices to accommodate a transparent display in an ergonomically efficient design.

BRIEF DESCRIPTION OF THE DRAWINGS

FIG. 6C illustrates one embodiment of an eighth system.
FIG. 10 illustrates one embodiment of a logic flow.

DETAILED DESCRIPTION

Figure 1:
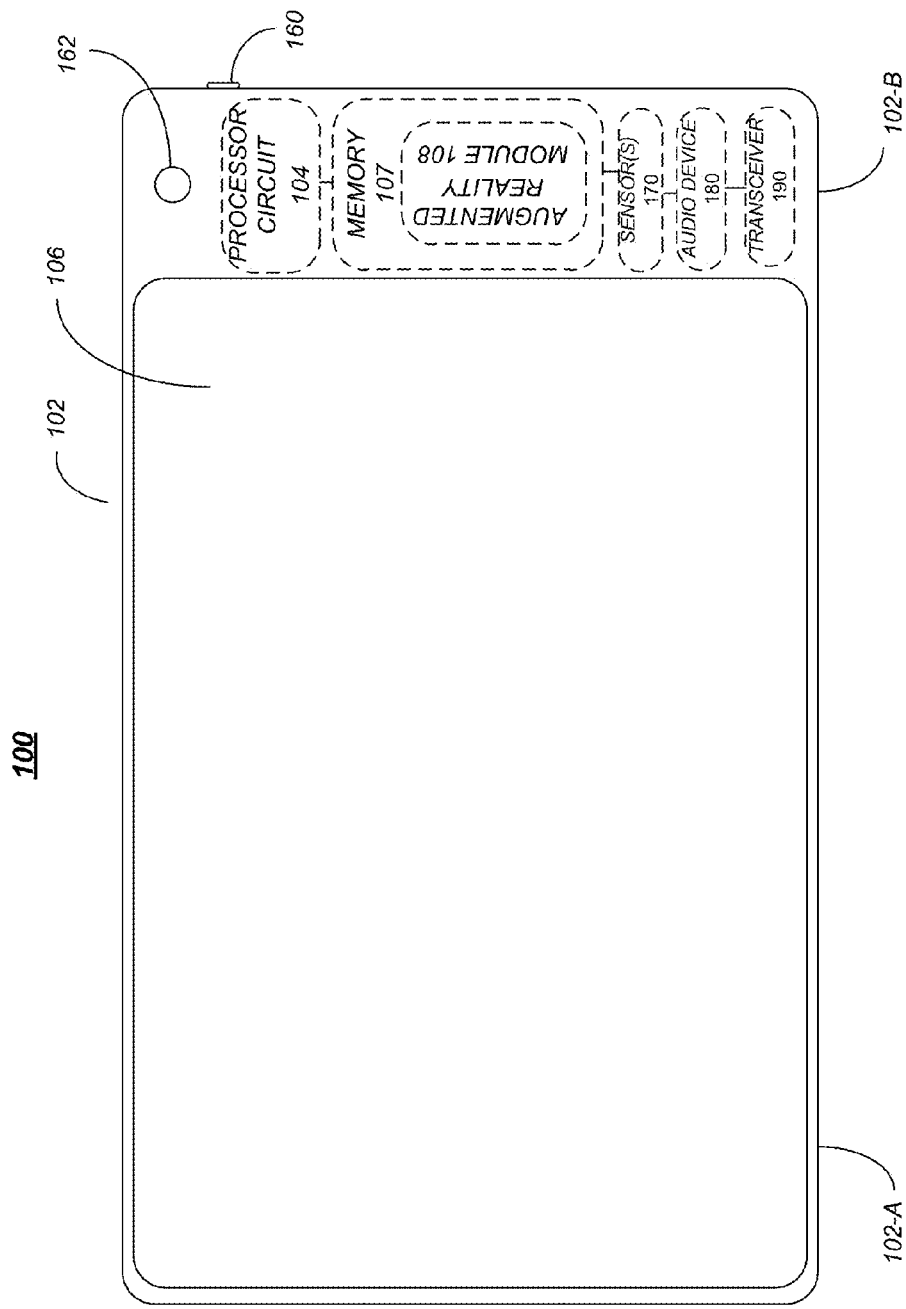
FIG. 1 illustrates one embodiment of a first system.

The embodiments are generally directed to a computing device, apparatus, system and method. Various embodiments provide a system and apparatus that includes an enclosure comprising a display portion and a component portion, the display portion arranged to support a transparent display and the component portion arranged to support a processor. The embodiments may additionally include an augmented reality module operative on the processor to display one or more graphical user interface elements on the transparent display and to arrange the one or more graphical user interface elements based on one or more elements in a real world environment in proximity to the computing device. Other embodiments are described and claimed.

The processing power and capabilities of modern mobile computing devices continues to increase, often resulting in increased functionality requirements. For example, in some embodiments it may be advantageous for a mobile computing device to include augmented reality functionality or applications. Augmented reality may comprise a live, direct or indirect, view of a physical, real world environment whose elements are augmented by computer-generated sensory input such as sound, video, graphics or GPS data in some embodiments. For example, augmented reality may comprise a view of reality that is modified by a computer to enhance a user's current perception of reality.

Augmentation is conventionally performed in real-time and in semantic context with environmental elements. With the help of advanced augmented reality technology, information about a surrounding real world environment of a user may become interactive and may be manipulated digitally, such as by manipulating artificial information about the environment and its objects that may be overlaid on a view of the real world environment. Currently available computing devices do not provide a good user experience for augmented reality functions as they generally rely on a digital representation of a real world environment, such as a representation captured by a digital camera and translated for presentation on a digital display.

Additionally, as the requirements for smaller devices with multifunction form factors continue to increase, it may be advantageous for computing devices to include standard computing functionality in addition to augmented reality functionality while maintaining an ergonomically and aesthetically pleasing form factor. Currently available computing devices generally sacrifice performance and/or design when incorporating both augmented reality functionality and standard computing functionality which may hinder the user experience and may fail to harness the full computing power of currently available devices. Therefore, some embodiments described herein are directed to techniques for a computing device, apparatus, system and method to enable augmented reality functionality in a computing device having a transparent display. Other embodiments are described and claimed.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1 illustrates one embodiment of a computing device or system 100. In various embodiments, the computing device 100 (also interchangeably referred to herein as a mobile computing device or a tablet computing device) may comprise multiple nodes, elements or components. A node, element or component generally may comprise any physical or logical entity in the computing device 100 and may be implemented as hardware, software, or any combination thereof, as desired for a given set of design parameters or performance constraints. Although FIG. 1 may show a limited number of nodes, elements and components by way of example, it can be appreciated that more or less nodes, elements or components may be employed for a given implementation.

In various embodiments, the computing device 100 may comprise a tablet computer, handheld computer, laptop computer, clamshell computer, netbook computer, ultrabook computer, personal digital assistant (PDA), cellular telephone, combination cellular telephone/PDA, smartphone, portable computer, pager, messaging device, media player, digital music player, or other suitable computing device. Various embodiments described herein include reference to a tablet computing device including a transparent display. The embodiments are not limited in this context.

Computing device 100 may comprise a device operative to form part of a wired communications system, a wireless communications system, or a combination of both. For example, the computing device 100 may comprise one or more nodes arranged to communicate information over one or more types of wired communication links. Examples of a wired communication link may include, without limitation, a wire, cable, link, printed circuit board (PCB), Ethernet connection, peer-to-peer (P2P) connection, backplane, switch fabric, semiconductor material, twisted-pair wire, co-axial cable, fiber optic connection, and so forth. The computing device 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The computing device 100 may communicate information in accordance with one or more standards as promulgated by a standards organization. In one embodiment, for example, various devices comprising part of the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the mobile computing device 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; IEEE 802.16 standards for WMAN including the IEEE 802.16 standard such as 802.16-2004, 802.16.2-2004, 802.16e-2005, 802.16f, and variants; WGA (WiGig) progeny and variants; European Computer Manufacturers Association (ECMA) TG20 progeny and variants; and other wireless networking standards. The embodiments are not limited in this context.

The computing device 100 may communicate, manage, or process information in accordance with one or more protocols. A protocol may comprise a set of predefined rules or instructions for managing communication among nodes. In various embodiments, for example, a communications system may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

In some embodiments, the computing device 100 may comprise or be associated with a network and a plurality of other nodes. In various embodiments, the nodes may be implemented as various types of wireless or mobile computing devices. Examples of wireless devices may include, without limitation, an IEEE 802.15.3 piconet controller (PNC), a controller, an IEEE 802.11 PCP, a coordinator, a station, a subscriber station, a base station, a wireless access point (AP), a wireless client device, a wireless station (STA), a laptop computer, ultra-laptop computer, portable computer, personal computer (PC), notebook PC, tablet computer, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, computing device 100 may comprise or include one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, computing device 100 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a radio network, a television network, a satellite network such as a direct broadcast satellite (DBS) network, a long term evolution (LTE) network and/or any other wireless communications network arranged to operate in accordance with the described embodiments.

While the embodiments are not limited in this context, computing device 100 illustrates one possible computing device in some embodiments. In various embodiments, computing device 100 may include enclosure 102 having a display portion 102-A and a component portion 102-B, a processor 104, display 106, memory 107, augmented reality module 108, integrated input/output (I/O) device(s) 160, camera 162, sensor(s) 170, audio device 180 and transceiver 190. While not shown in FIG. 1, in some embodiments the computing device 100 may include one or more additional or alternative platform component(s). While a limited number and arrangement of components are shown in FIG. 1 for purposes of illustration, it should be understood that computing device 100 may include any number or arrangement of components and still fall within the described embodiments. As such, the embodiments are not limited to the elements or the configuration shown in this figure. Additional components for computing device 100 are discussed in further detail below with reference to FIG. 11.

Computing device 100 may include one or more processors 104 in some embodiments. A processor or processor 104 may comprise any suitable electric device, semiconductor device, system on chip or other component in some embodiments. For example, a processor 104 may comprise a multi-core processor in various embodiments. In some embodiments, a processor 104 may include or comprise one or more radio modules or combination transmitter/receiver (e.g. transceiver) devices. In various embodiments, the transceiver device 170, shown separately in FIG. 1 for purposes of illustration and not limitation, may comprise a device that has both a transmitter and a receiver that are combined and share common circuitry or a single housing. For example, in some embodiments, the transceiver 170 may be operative to enable wireless communication capabilities for computing device 100. Other embodiments are described and claimed.

Computing device 100 may include memory 107 in some embodiments. The memory 107 may comprise any suitable physical device operative to store data, programs, sequences of instructions or other information on a temporary or permanent basis for use in computing device 100 in some embodiments. For example, memory 107 may comprise volatile or non-volatile memory, RAM, ROM, virtual memory, solid state disk drive or a hard disc drive for example. The embodiments are not limited in this context.

In various embodiments, computing device 100 may include one or more integrated devices or one or more input/output (I/O) ports 160 arranged on or as part of enclosure 102. In some embodiments, the one or more integrated input devices 160 may comprise a volume rocker switch or a home button. For example, in some embodiments the computing device 100 may include only one button or switch that is discretely located on a side of enclosure 102. In various embodiments, the single button or switch may be operative to turn the computing device 100 on and off and may also control various other functionality, including operating as a home screen button. While not shown in detail in FIG. 1, some embodiments may include one or more power adapter ports. Other embodiments are described and claimed.

In other embodiments, the one or more I/O ports or devices 160 may be communicatively coupled to the one or more processors 104 to allow for communication with one or more peripheral devices coupled to the one or more I/O ports or devices 160. In various embodiments, the one or more I/O ports or devices 160 may comprise one or more of an Ethernet interface, a Universal Serial Link (USB) interface, a Thunderbolt® interface, a DisplayPort interface, a MiniDisplayPort (mDP) interface, an audio interface and/or the like. While shown on a particular side of computing device in FIG. 1, it should be understood that the one or more integrated input devices or one or more I/O portions 160 could be arranged anywhere on enclosure 102 and still fall within the described embodiments. In some embodiments, the one or more I/O ports or devices 160 are arranged on the component portion 102-B of the enclosure 102. Other embodiments are described and claimed.

In various embodiments, computing device 100 may include one or more sensors 170. The one or more sensors 170 may comprise one or more of a camera, accelerometer, proximity sensor, light sensor, compass or global positioning system (GPS) in some embodiments. The one or more sensors 170 of mobile computing device 100 may be arranged to provide various different functionality for the computing device 100, such as tilt sensing, rotating one or more user interface elements displayed on display 106 or any other suitable function as one skilled in the art would readily understand. In some embodiments, for example, the sensor(s) 170 may provide location based functionality for computing device 100 as described elsewhere herein. Other embodiments are described and claimed.

Computing device 100 may comprise an audio device 180 in some embodiments. Audio device 180 may comprise any device capable of generating or detecting tones, music, speech, speech utterances, sound effects, background noise, or other sounds based on received or detected audio data. Examples of audio device 180 may include a microphone, speaker, a multi-speaker system, a home entertainment system, a television, a consumer appliance, a computer system, a mobile device, and a portable electronic media device, among other examples. In some embodiments, audio device 180 may be arranged to generate tones, music, speech, speech utterances, sound effects, background noise, or other sounds based on audio data received from computing device 100 or may be operative to detect tones, music, speech, speech utterances, sound effects, background noise, or other sounds existing outside of computing device 100, such as the spoken voice of a user of the computing device 100. In some embodiments, audio data may be generated by processor 104. The embodiments are not limited in this context.

In some embodiments, computing device 100 may include one or more camera(s) 162 or 164 (not shown in FIG. 1). The camera(s) 162, 164 may comprise any device suitable for capturing video or still photographs, or both, digitally by recording images via an electronic image sensor. In some embodiments, computing device 100 may include at least one camera 162 on a front side of the enclosure 102 as shown in FIG. 1 and at least one camera on a back side of the enclosure 102 as shown and described elsewhere herein. Other embodiments are described and claimed.

Computing device 100 may include an enclosure 102 in some embodiments. Enclosure 102 may comprise an enclosure, housing, case or other device suitable to support, surround, protect or enclose one or more computing components for computing device 100. For example, enclosure 102 may comprise a rigid plastic or metal body that surrounds or supports one or more computing components for computing device 100. In various embodiments, enclosure 102 may comprise the body or main portion of a tablet computer and may additionally include or support processor 104, memory 107, one or more wireless transceivers 190 operative to enable wireless communications for the computing device using one or more wireless communication protocols, one or more energy storage modules (not shown), display 106 or any other suitable component of computing device 100. Other embodiments are described and claimed.

In some embodiments, enclosure 102 may be designed to have a thin and sleek form factor in accordance with many modern computing system designs. While the embodiments are not limited in this respect, enclosure 102 may comprise a form factor similar to a tablet computing device in some embodiments. In various embodiments, enclosure 102 may be arranged with a display portion 102-A arranged to frame or support display 106 and a component portion 102-B arranged to support any number and type of platform components as shown in FIG. 1. While named as separate components of the enclosure 102 for purposes of illustration, it should be understood that the embodiments are not limited in this respect. For example, in various embodiments, the display portion 102-A and the component portion 102-B together may form a substantially contiguous enclosure 102. The embodiments are not limited in this respect.

In some embodiments, display 106 may comprise any suitable visual interface for displaying content to a user of the computing device 100. In one embodiment, for example, the display 106 may comprise a transparent display arranged to occupy or comprise a substantial portion of the overall size of computing device 100 in some embodiments. In various embodiments, one or more elements in a real world environment may be visible directly through the transparent display 106. For example, the display 106 may comprise or act as a lens through which a user is able to directly view a real world environment in real time without obstruction.

Display 106 may comprise a transparent light-emitting diode display or a transparent liquid crystal display in some embodiments. In various embodiments, display 106 may additionally comprise a touch-sensitive display communicatively coupled to the processor 104. For example, display 106 may be implemented by a liquid crystal display (LCD) or a touch-sensitive color LCD screen. The touch-sensitive LCD may be responsive to human touch or may be used with a stylus and/or a handwriting recognizer program in some embodiments. In other embodiments, display 106 may comprise a plasma display, light-emitting diode (LED) display, an organic light-emitting diode (OLED) display or an active-matrix organic light-emitting diode AMOLED display. Display 106 may comprise a digital touchscreen display arranged to occupy a substantial portion of a first side or front of a computing device 100 in some embodiments.

While not shown in FIG. 1, computing device 100 may include one or more energy storage modules in some embodiments. The energy storage modules may comprise any device suitable for providing electrical power to computing device 100 in various embodiments. For example, the one or more energy storage modules may comprise a battery or a plurality of batteries or other energy storage devices capable of storing and providing power to computing device 100. In some embodiments, the one or more energy storage modules may comprise cylindrically shaped batteries or flat packed batteries, such as Lithium Ion batteries or any other suitable battery technology. Other embodiments are described and claimed.

Figure 2:
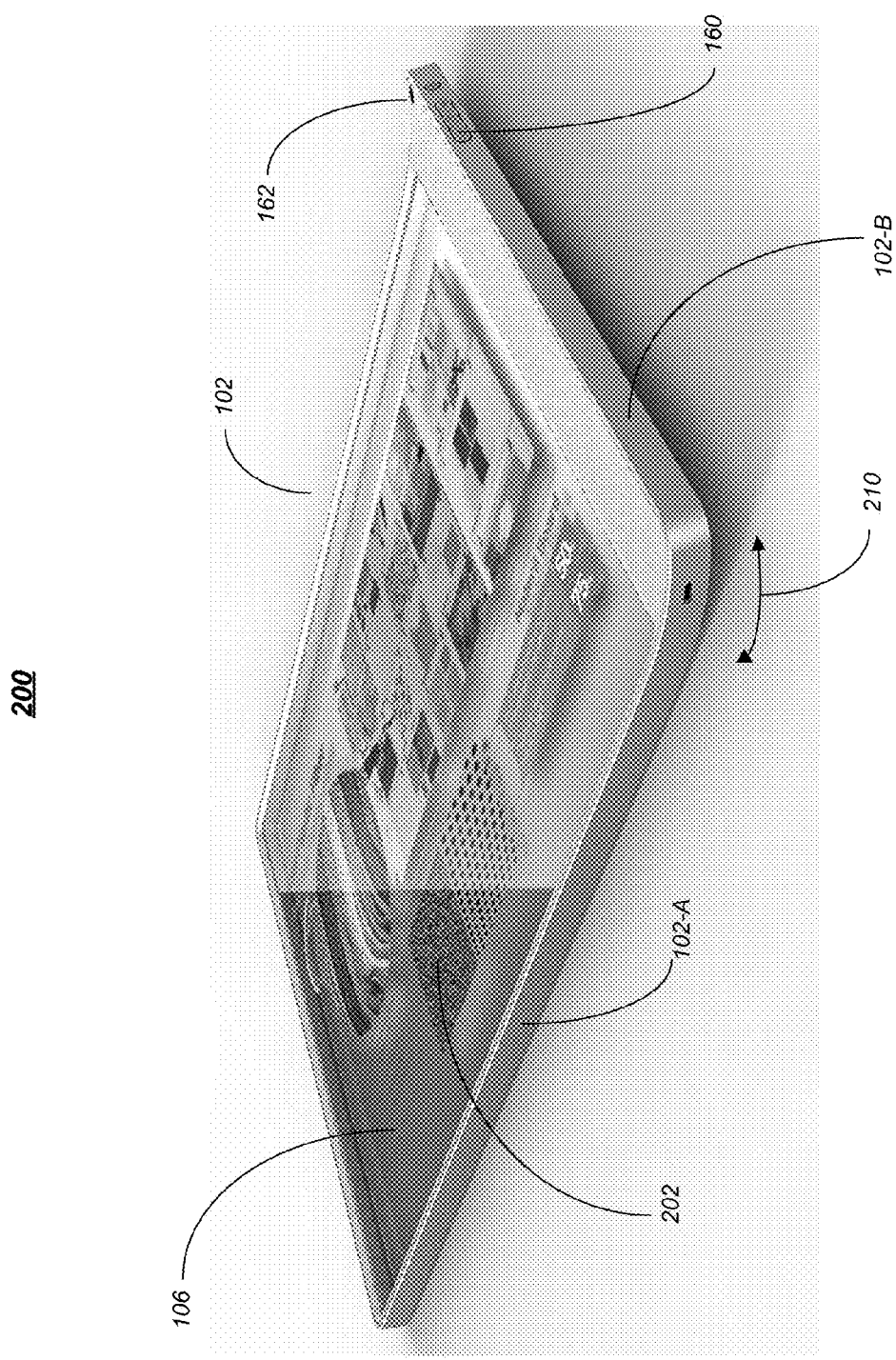
FIG. 2 illustrates one embodiment of a second system.
Figure 3:
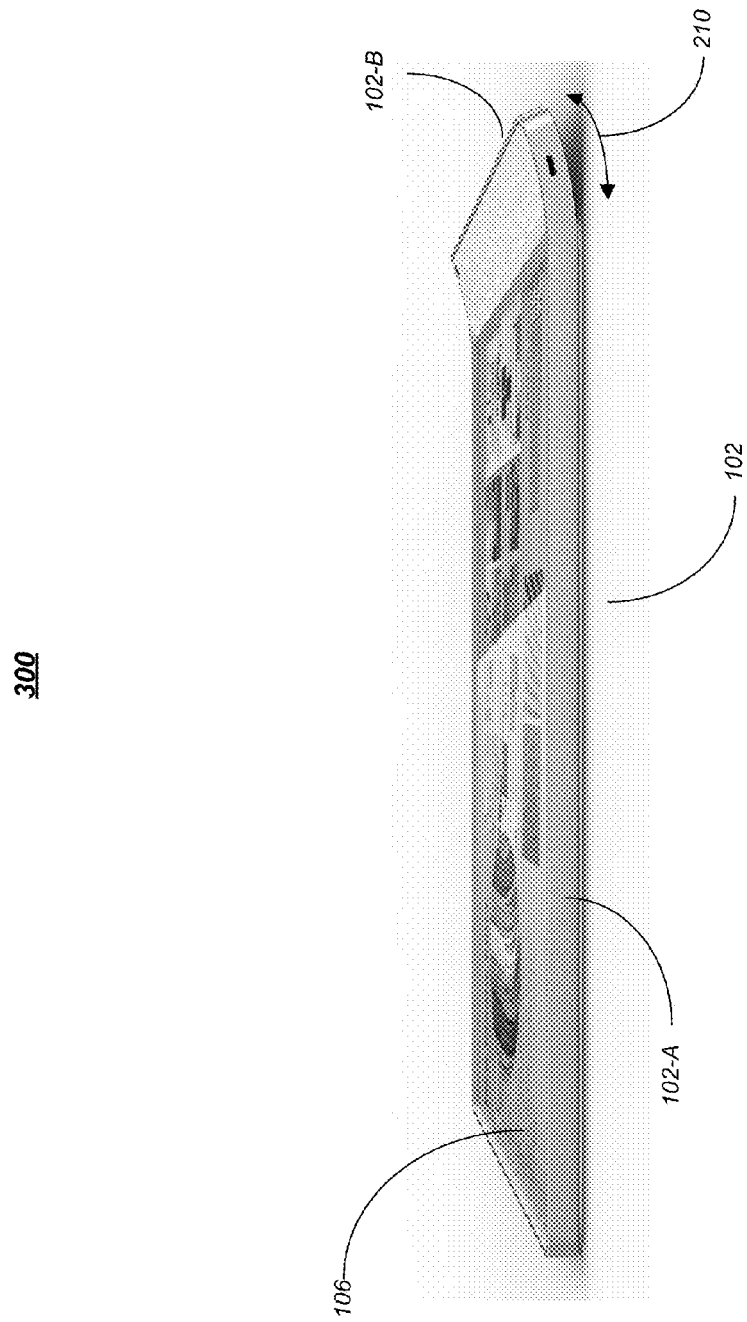
FIG. 3 illustrates one embodiment of a third system.

FIGS. 2 and 3 illustrate embodiments of computing devices or systems 200 and 300 respectively. The computing devices 200 and 300 may comprise computing devices 200 and 300 that may be the same or similar to computing device 100 of FIG. 1 where like elements are similarly numbered. In various embodiments, FIG. 2 may illustrate a front or top perspective view of computing device 200 that includes a transparent display 106 and FIG. 3 may illustrate a side or top perspective view of computing device 300 that includes transparent display 106.

Display 106 of computing devices 200 and 300 may comprise a substantially transparent or see-through display that allows for a clear view from a front side of the devices 200 and 300 to a back side of the devices 200 and 300 and/or vice versa. In some embodiments, the display 106 may be arranged as a lens or window through which a clear view can be obtained and/or on which information such as one or more graphical user interface elements 202 can be displayed. The transparent display 160 may be framed by the display portion 102-A of the enclosure 102 in some embodiment and may be arranged to allow for a view through the computing devices 200 and 300. Other embodiments are described and claimed.

As shown in FIGS. 2 and 3, the component portion 102-B may be curved or angled with respect to the display portion 102-A in some embodiments. For example, the arrows 210 indicate an example curve of the component portion 102-B with respect to the display portion 102-A. The curved portion of enclosure 102 (e.g. component portion 102-B) may house or contain the platform components for computing device 100, allowing for the transparent view through display 106 to not be obstructed by platform components that are traditionally located behind the display in many modern computing devices.

Figure 4:
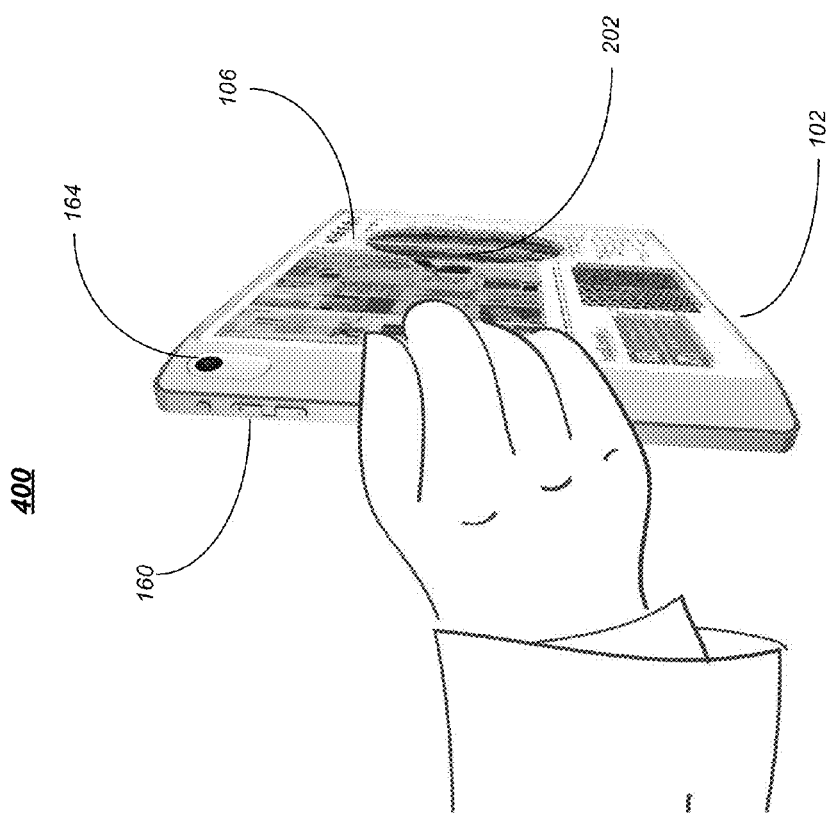
FIG. 4 illustrates one embodiment of a fourth system.

FIG. 4 illustrates one embodiment of a computing device or system 400. The computing device 400 may be the same or similar to computing device 100 of FIG. 1, 200 of FIG. 2 and/or 300 of FIG. 3 where like elements are similarly numbered. In various embodiments, FIG. 4 may illustrate a perspective view of computing device 400 being held by a user. As shown in FIG. 4, the curved component portion 102-B of enclosure 102 of computing device 400 may provide or act as an ergonomic handle allowing for easy holding, operating and interacting with computing device 400. While shown has having a curve in the direction of a front of the device 400, it should be understood that the curve or angle of component portion 102-B of enclosure 102 could be in any suitable direction, have any suitable angle or amount of curve and have any size and still fall within the described embodiments.

Figure 5:
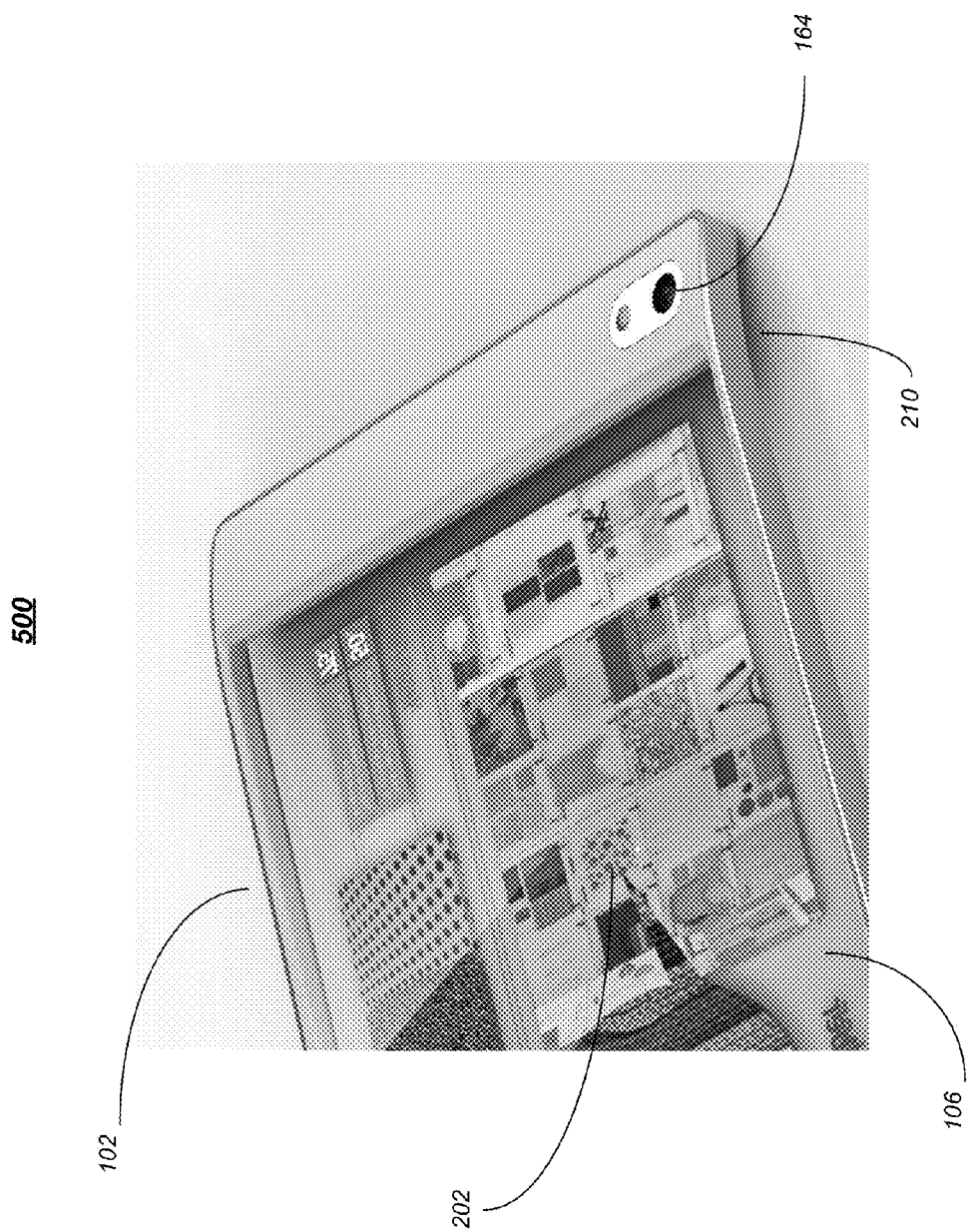
FIG. 5 illustrates one embodiment of a fifth system.

As shown in FIG. 4, computing device 400 may additional or alternatively include a second camera 164 arranged on a back side of computing device 400 as also shown in FIG. 5. FIG. 5 illustrates one embodiment of a computing device or system 500. The computing device 500 may be the same or similar to hybrid computing device 100 of FIG. 1, 200 of FIG. 2, 300 of FIG. 3 and/or 400 of FIG. 4 where like elements are similarly numbered. In various embodiments, FIG. 5 may illustrate a second back perspective view of computing device 500.

As shown in FIG. 5, camera 164 may be arranged on a back of enclosure 102. Camera 164 may be arranged to capture images in a direction opposite that of camera 162 arranged on a front of enclosure 102. In various embodiments, arranging cameras 162, 164 on both the front and back of enclosure 102 may allow for advanced functionality to be incorporated into computing device 500 as discussed elsewhere herein.

In some embodiments, FIG. 5 illustrates the transparent display 106 as seen or viewed from a back side of computing device 500. As shown in FIG. 5, the transparent display 106 includes one or more graphical user interface elements (GUI) 202 that are arranged to be visible, readable or understandable from the front of display 106. The one or more GUI elements 202 are also visible from the back of display 106 as shown in FIG. 5, however, from the back these images may appear reversed or inverted. Other embodiments are described and claimed.

The above-described embodiments may be better understood with reference to the following examples.

Figure 6A:
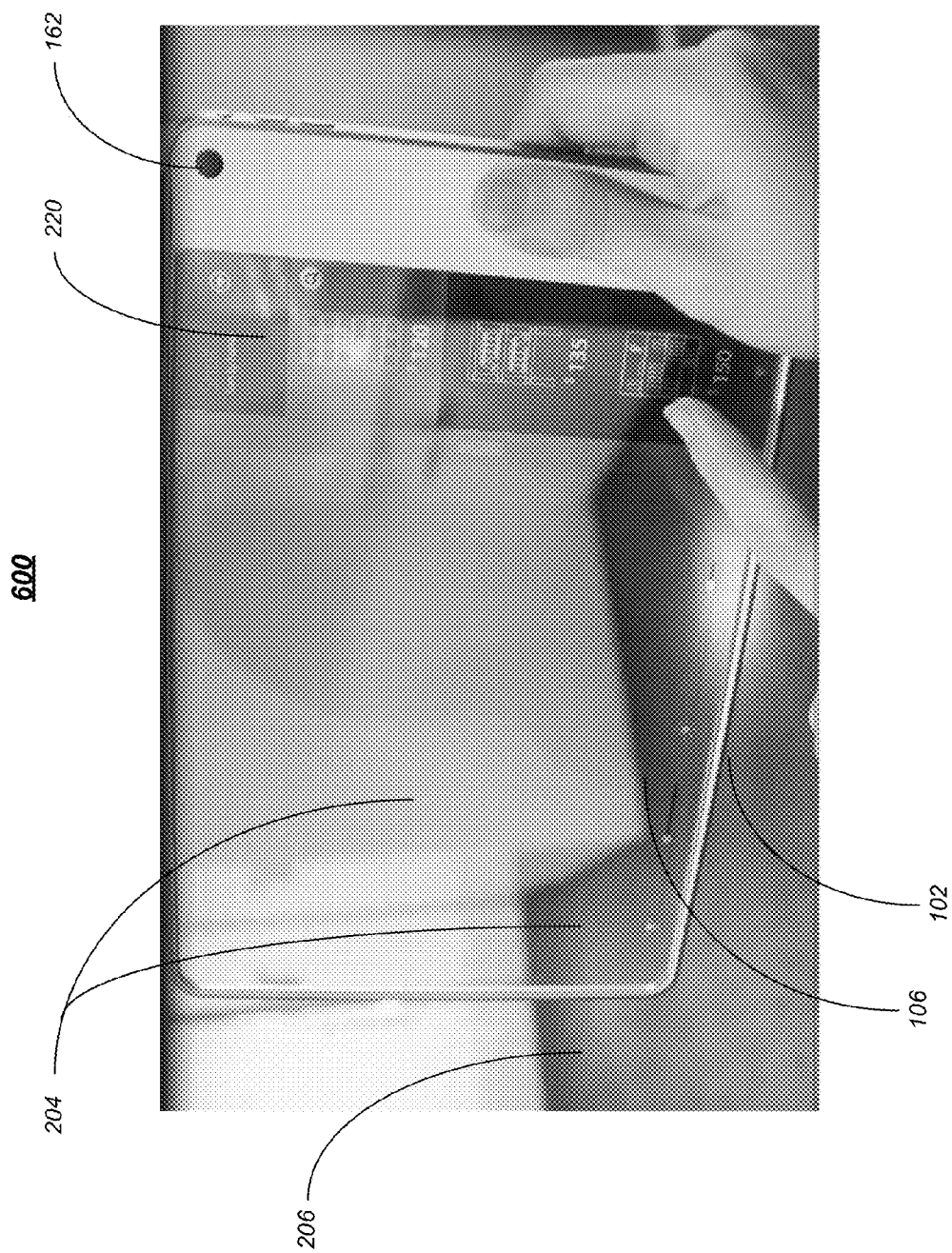
FIG. 6A illustrates one embodiment of a sixth system.
Figure 6B:
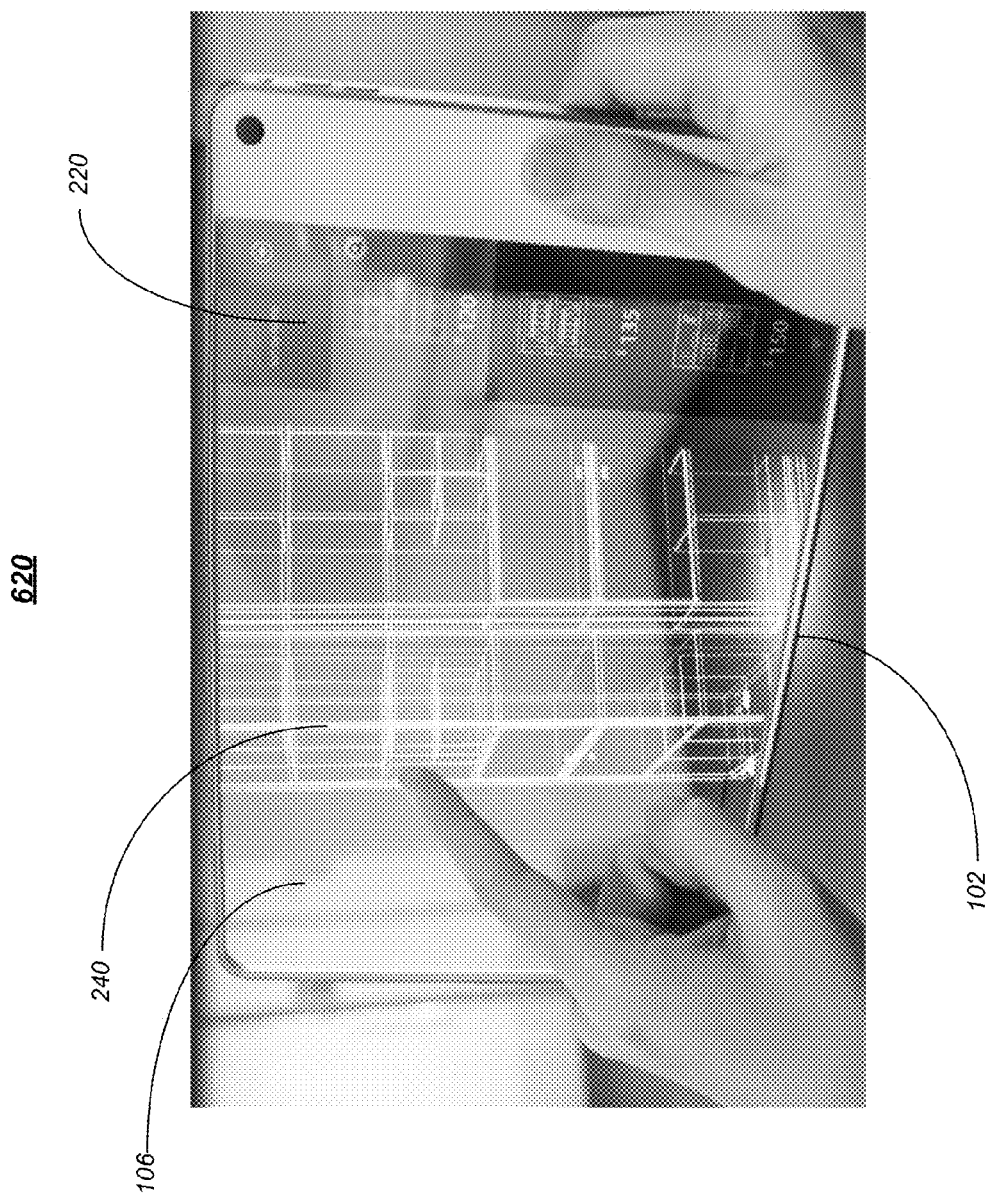
FIG. 6B illustrates one embodiment of a seventh system.

FIGS. 6A, 6B and 6C illustrate examples of a computing device or system in different stages of operation 600, 620 and 640 respectively. The computing devices 600, 620 and 640 shown in FIGS. 6A, 6B and 6C may be the same or similar to computing devices 100 of FIG. 1, 200 of FIG. 2, 300 of FIG. 3, 400 of FIG. 4 and/or 500 of FIG. 5 where like elements are similarly numbered. While not shown in FIGS. 6A, 6B and 6C, in various embodiments the computing devices 600, 620 and 640 may be arranged to include an augmented reality module 108 as shown in FIG. 1. Augmented reality module 108 may comprise logic or instructions operative on the processor 104 to perform any number of functions or actions. While shown as being stored in memory 107 in FIG. 1, the embodiments are not limited in this respect and augmented reality module 108 may be arranged anywhere within the computing device and still fall within the described embodiments. In some embodiments, augmented reality module 108 may comprise dedicated hardware such as a hardware acceleration unit or a system on chip (SoC) device rather than a software module or instructions that are stored for execution by a processor. The embodiments are not limited in this respect.

As shown in FIG. 6A, computing device 600 may include a transparent display 106. In some embodiments, inclusion of a transparent display 106 may allow for a clear or view through the display 106 which may reveal one or more real world elements 204 in a real world environment 206 when a user looks at or through the display 106. In some embodiments, the one or more real world elements 204 may comprise any suitable object that is visible to a user of device 600, such as the wall and floor in the image of FIG. 6A. The real world environment 206 may comprise any real, three dimensional space including indoor and/or outdoor spaces, such as the room environment shown in FIG. 6A. It should be understood that the embodiments are not limited to the example real world elements 204 and real world environments 206 shown and described herein.

In some embodiments, augmented reality module 108 may be operative to display one or more graphical user interface (GUI) elements on the transparent display 106 as described elsewhere herein. Additionally or alternatively, the GUI elements may comprise augmented reality overlay information 220 in some embodiments. The augmented reality overlay information 220 may represent information related to the current operating environment in which the computing device 600 is located as determined by the one or more sensors 170, cameras 162, 164 or any other suitable component. For example, in the embodiment shown in FIG. 6A, the augmented reality overlay information 220 may represent items that may be arranged in the room or real world environment 206.

In various embodiments, responsive to user input, the augmented reality module 108 may be operative to generate a virtual representation of one or more real world elements 240 based on a selection from the augmented reality overlay information 220. In the example shown in FIG. 6B, a user may select a bookcase and the augmented reality module 108 may be operative to generate a virtual representation 240 of the bookcase to enable the user to view the virtual representation 240 on display 106 as if the virtual representation 240 were actually present in the real world environment when viewed through display 106.

In various embodiments the virtual representation of the real world elements 240 may be sized and configured manually by a user or the augmented reality module 108 may be operative to arrange the virtual representation 240 automatically. For example, the augmented reality module 108 may be operative to arrange the one or more graphical user interface elements or virtual representations 240 based on one or more elements in a real world environment in proximity to the computing device. In the example of FIG. 6B, the augmented reality module 240 may be operative to automatically size the virtual bookshelf 240 based on the detected dimensions of the room and may arrange the virtual bookshelf 240 in a desired location, such as against a wall of the room. The embodiments are not limited in this respect.

As shown in FIG. 6C, the schematic virtual representation 240 shown in FIG. 6B may be converted to a virtual representation 240 more accurately representing or depicting the real world element in some embodiments. For example, augmented reality module 108 may be operative to generate a realistic virtual representation 240 in various embodiments. In some embodiments, augmented reality module 108 may enable a user to adjust the size, shape, configuration, color, opacity, clarity, location or any other suitable attribute of the virtual representation 240. Other embodiments are described and claimed.

Figure 7A:
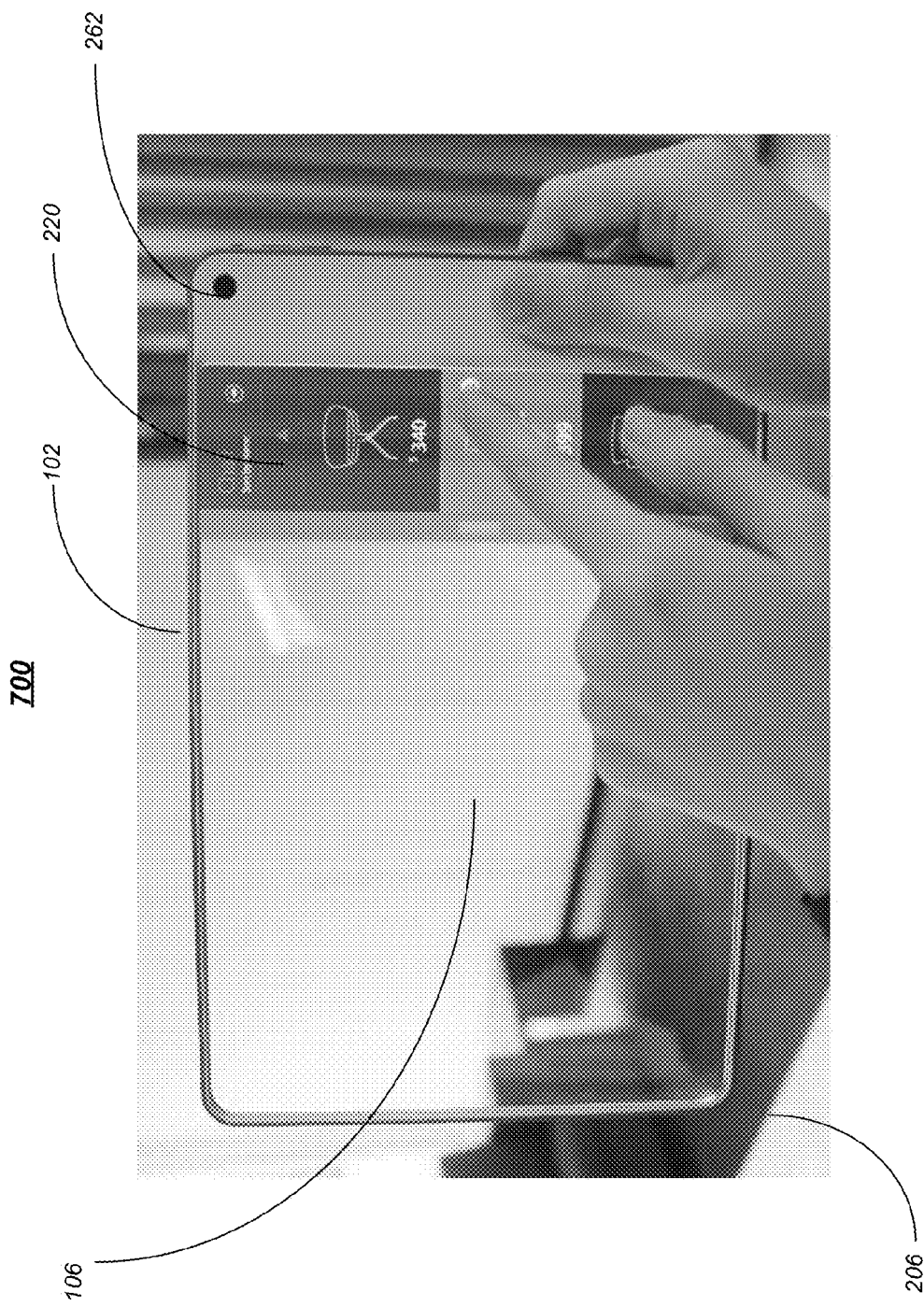
FIG. 7A illustrates one embodiment of a ninth system.
Figure 7B:
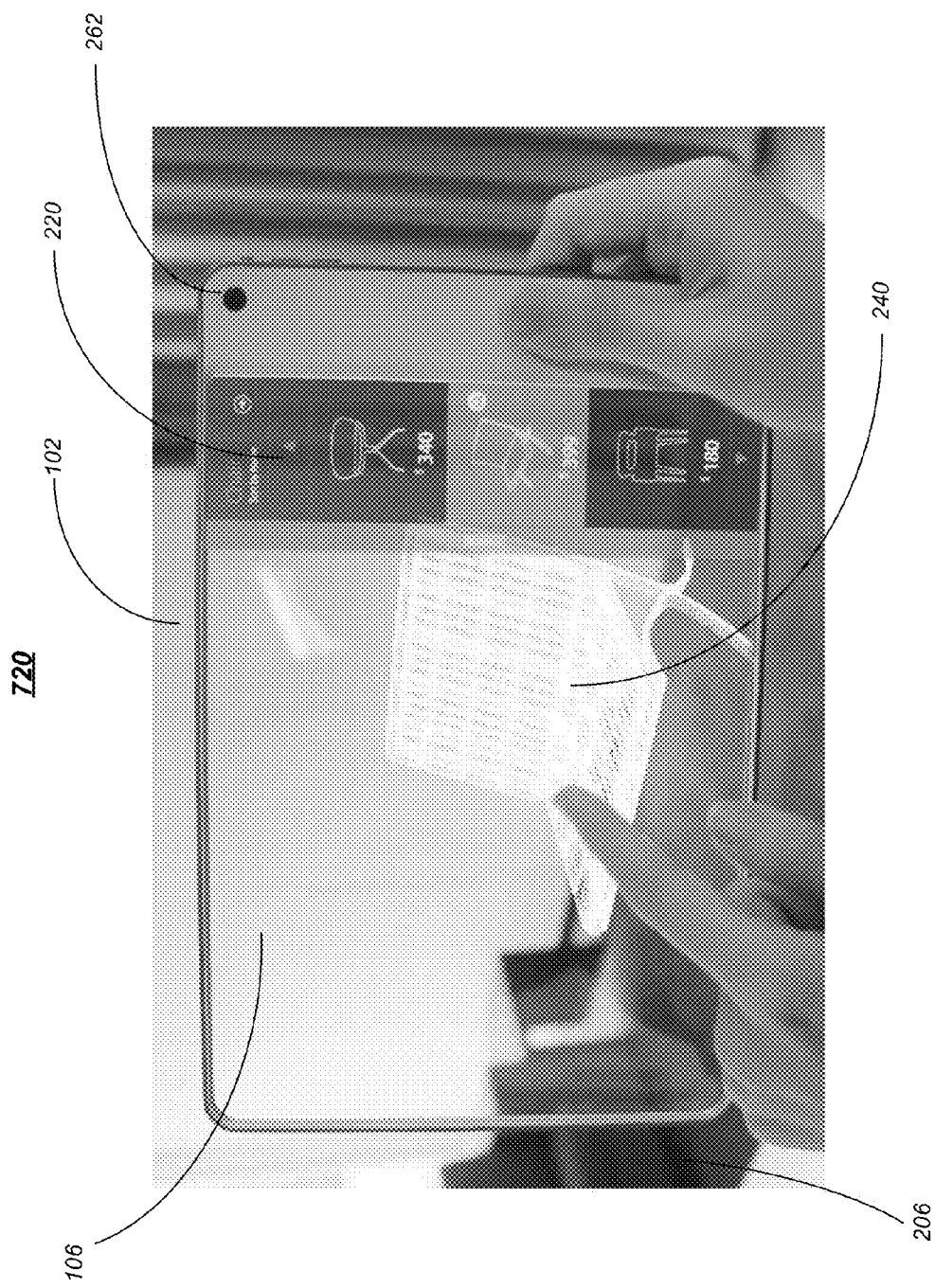
FIG. 7B illustrates one embodiment of a tenth system.
Figure 7C:
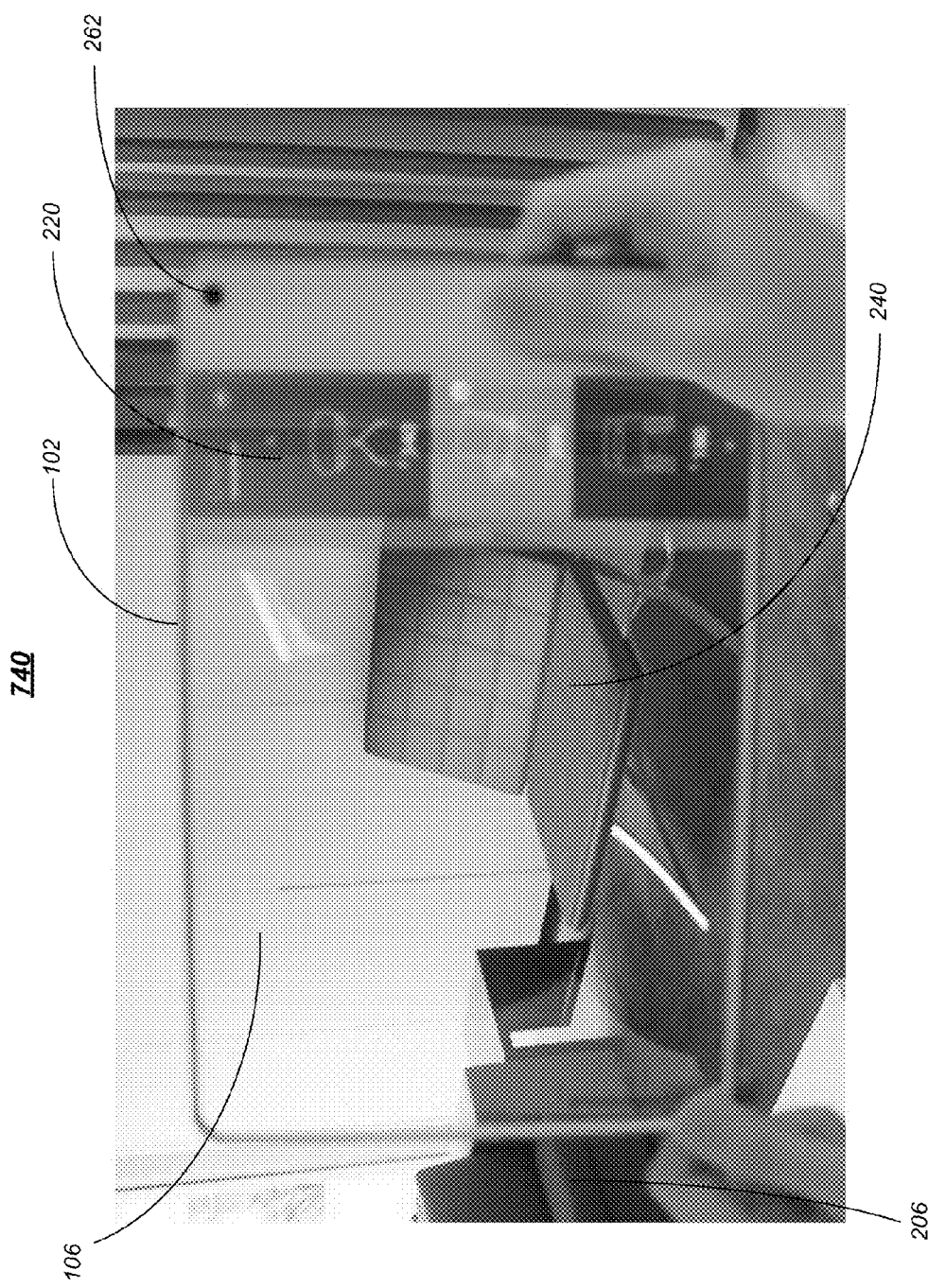
FIG. 7C illustrates one embodiment of an eleventh system.

FIGS. 7A, 7B and 7C illustrate examples of a computing device or system in different stages of operation 700, 720 and 740 respectively. The computing devices 700, 720 and 740 shown in FIGS. 7A, 7B and 7C may be the same or similar to computing devices 100 of FIG. 1, 200 of FIG. 2, 300 of FIG. 3, 400 of FIG. 4 and/or 500 of FIG. 5 and the user case scenarios shown in FIGS. 6A, 6B and 6C where like elements are similarly numbered. While not shown in FIGS. 7A, 7B and 7C, in various embodiments the computing devices 700, 720 and 740 may be arranged to include an augmented reality module 108 as shown in FIG. 1.

In various embodiments, similar to the examples described with respect to 6A, 6B and 6C, the computing device 700 in FIG. 7A may include a transparent display 106 through which a user can directly view a real world environment 206. Augmented reality module 108 may be operative to generate one or more GUI elements 220 corresponding to virtual representations 240 of real world elements and may be operative, as shown in FIGS. 7B and 7C, to display the virtual representations 240 as though they were actually present in the real world environment 206. In some embodiments, the augmented reality module 108 may be operative to automatically update the one or more graphical user interface elements or virtual representations 240 based on movement of the computing device 700, 720, 740. For example, if a user moves the computing device 700, 720, 740 or changes position within the real world environment 206, augmented reality module 108 may be operative to automatically adjust the location, orientation, size or any other suitable parameter of the virtual representation 240 such that the virtual representation 240 remains properly sized and placed in the real world environment 206 when viewed through display 106.

In some embodiments, the augmented reality module 108 may similarly be operative to automatically update the one or more graphical user interface elements or virtual representations 240 based on movement of at least one of the one or more elements in the real world environment 260. For example, if the real world chair and side table shown in FIGS. 7A, 7B and 7C were relocated, augmented reality module 108 may be operative to detect this change and to automatically update the placement of the virtual representation 240 of the chair. In some embodiments, the detection may be based in information captured using camera 264 or any of sensors 170. Other embodiments are described and claimed.

Figure 8A:
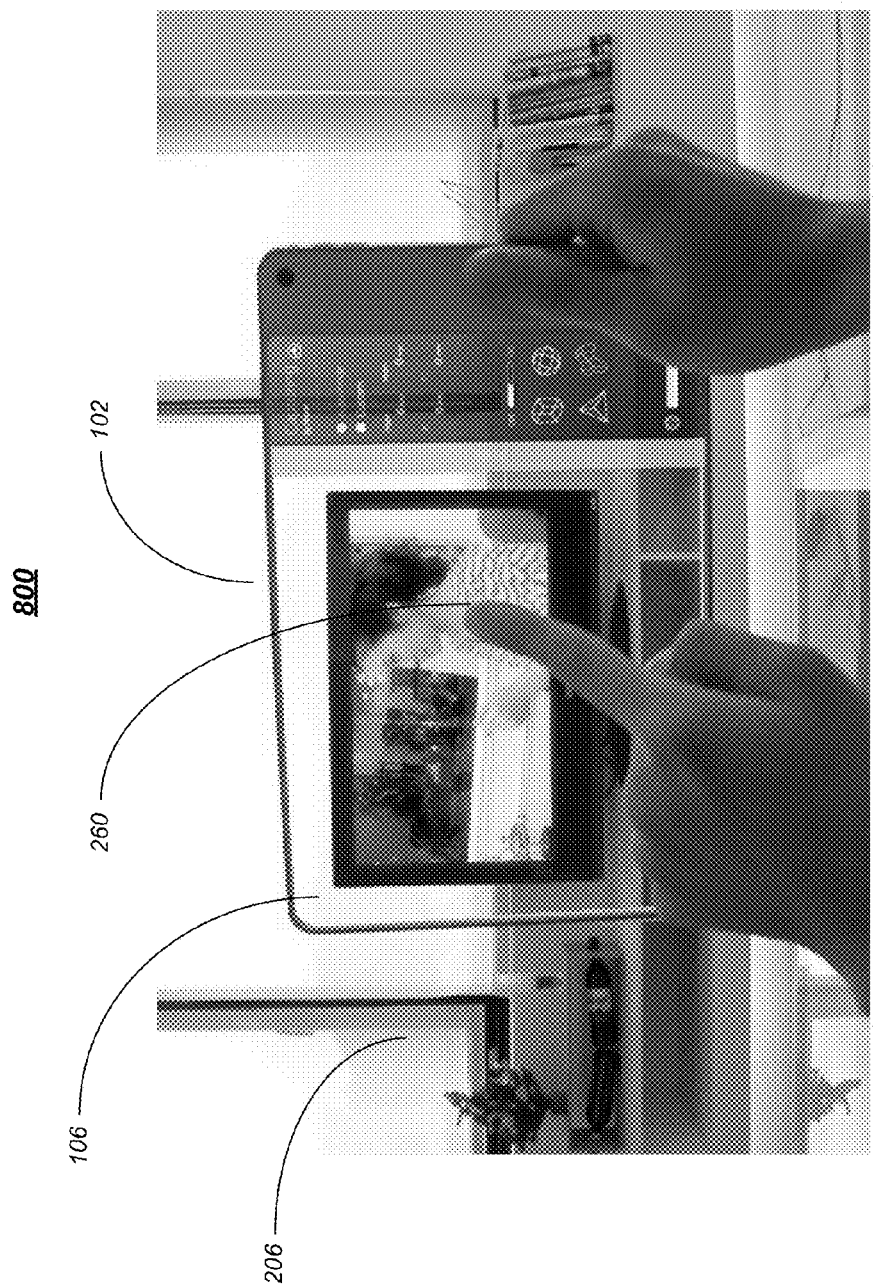
FIG. 8A illustrates one embodiment of a twelfth system.
Figure 8B:
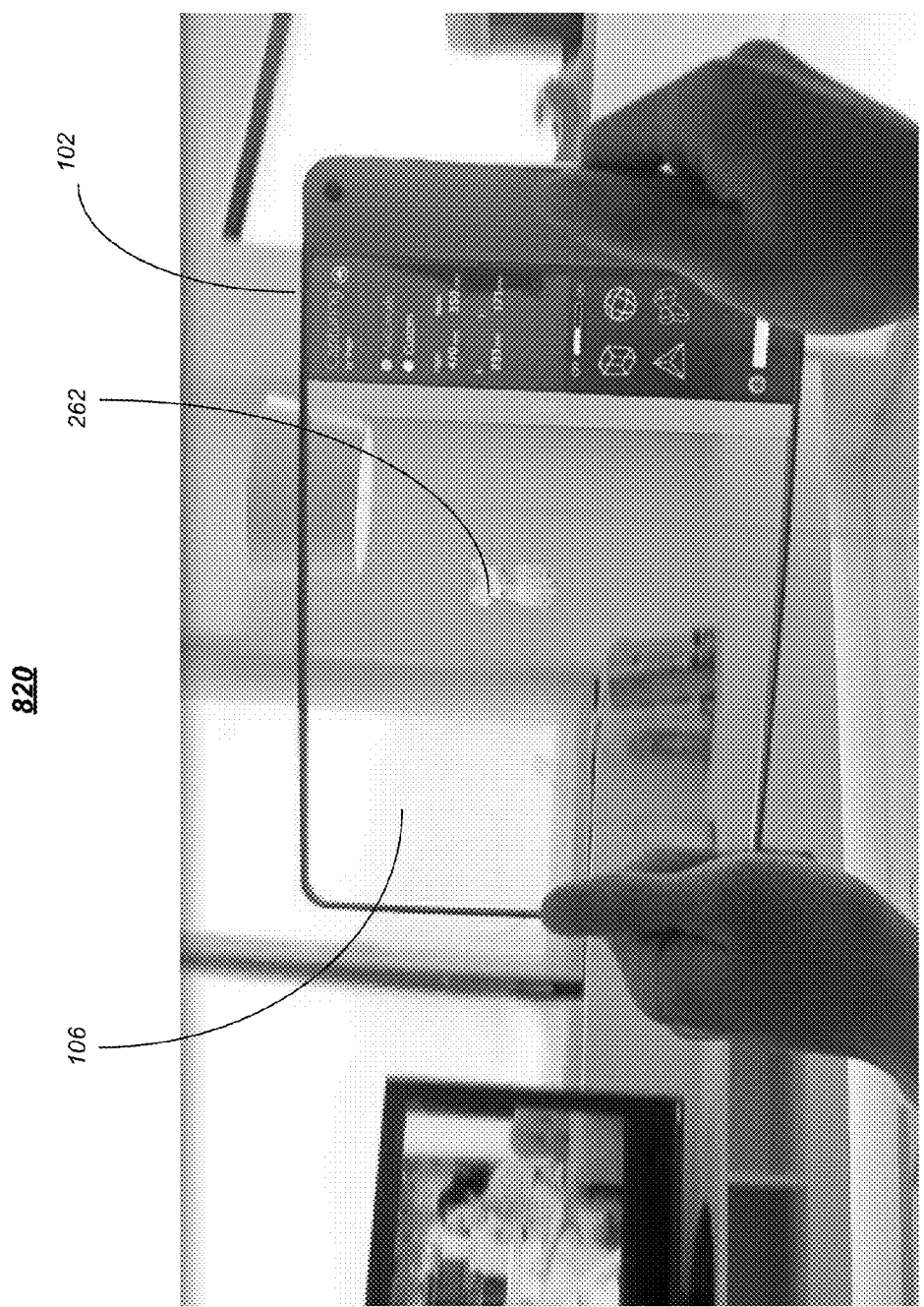
FIG. 8B illustrates one embodiment of a thirteenth system.
Figure 8C:
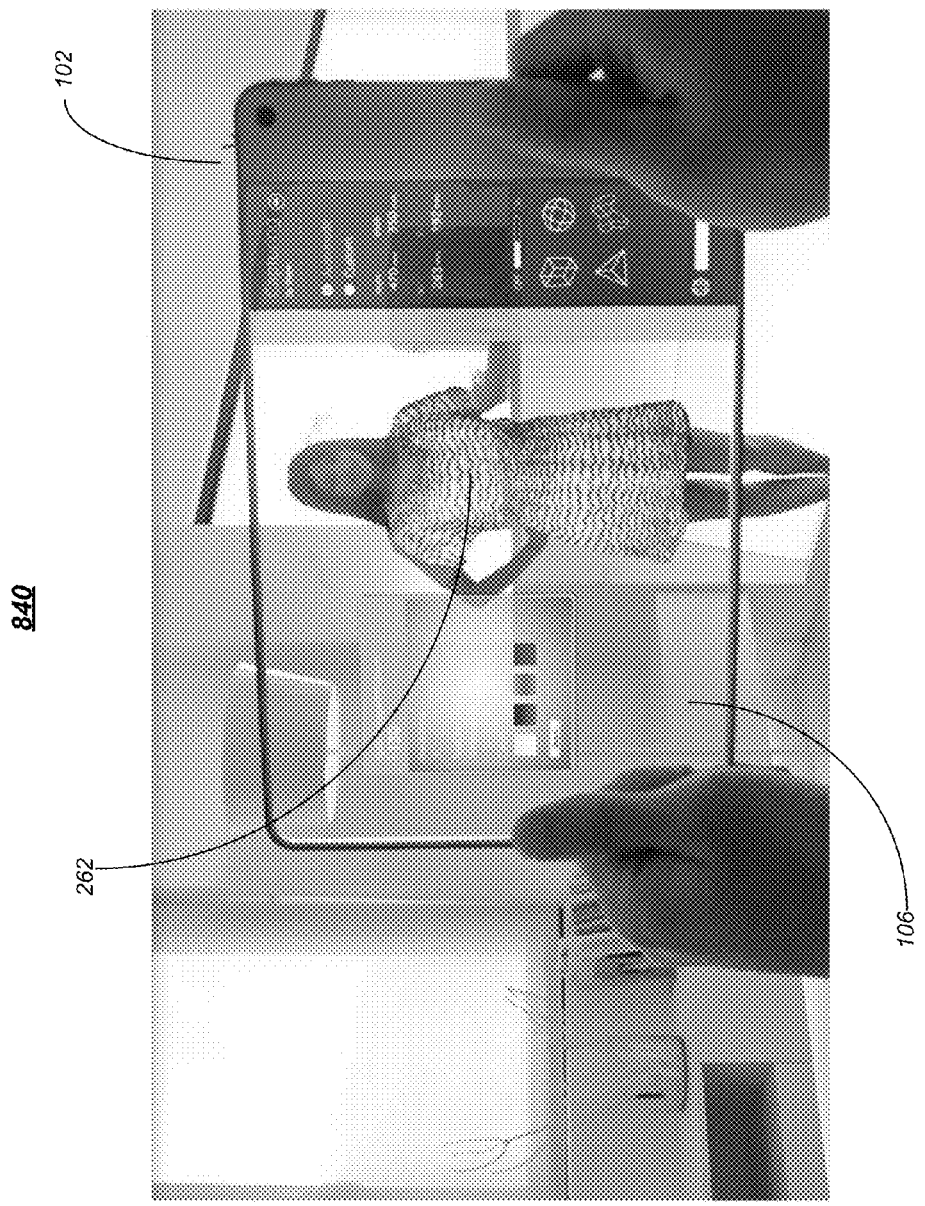
FIG. 8C illustrates one embodiment of a fourteenth system.

FIGS. 8A, 8B and 8C illustrate examples of a computing device or system in different stages of operation 800, 820 and 840 respectively. The computing devices 800, 820 and 840 shown in FIGS. 8A, 8B and 8C may be the same or similar to computing devices 100 of FIG. 1, 200 of FIG. 2, 300 of FIG. 3, 400 of FIG. 4 and/or 500 of FIG. 5 and the user case scenarios shown in FIGS. 6A, 6B and 6C and FIGS. 7A, 7B and 7C where like elements are similarly numbered. While not shown in FIGS. 8A, 8B and 8C, in various embodiments the computing devices 800, 820 and 840 may be arranged to include an augmented reality module 108 as shown in FIG. 1.

In some embodiments, as shown in FIG. 8A, the transparent display 106 of computing device 800 may allow for a substantially clear view through the device 800 into the real world environment 206. In some embodiments, the augmented reality module 108 may be operative to detect one or more real world elements in proximity to the computing device. In the example shown in FIG. 8A, the real world elements may comprise a dress that is worn by a person displayed on a display in the real world environment. It should be understood that the embodiments are not limited in this respect and any suitable real world element may be detected and/or identified by computing device 800.

In various embodiments, augmented reality module 108 may be operative to allow for a selection of the real world element which may result in the generation, by the augmented reality module 108, of a virtual representation 262 of the real world element 260 as shown in FIG. 8B. This conversion from a real world element 260 to a virtual representation of the real world element 262 may be based on a visual recognition system of computing device 800, 820, 840 or based on meta data associated with the real world element 260 that is discoverable by device 800, 820, 840 using known discovery techniques. The embodiments are not limited in this respect.

The virtual representation 262 of the real world element 260 may be arranged as any overlay on another real world element in some embodiments as shown in FIG. 8C. For example, the virtual representation 262 of the dress may be arranged as an overlay on the woman shown in FIG. 8C. In some embodiments, augmented reality module 108 may be operative to size and manipulate the virtual representation 262 based on any number of suitable factors including but not limited to size, dimensions and orientation of the overlay target, desired color, movement of the overlay target, etc. Other embodiments are described and claimed.

As shown in FIG. 8C and as also shown elsewhere herein, a portion of the display 106 may include information or GUI elements that result in the display being less transparent or semi-transparent. In some embodiments, while not shown, the entire display 106 may be covered with information or GUI elements that result in the entire display or a large portion of the display being only semi-transparent or non-transparent. For example, the computing devices described herein may be operated as traditional tablet computing devices by overlaying dark, semi-transparent, or non-transparent overlay information on the display 106 along with any desired display content or other GUI information. Other embodiments are described and claimed.

Figure 9A:
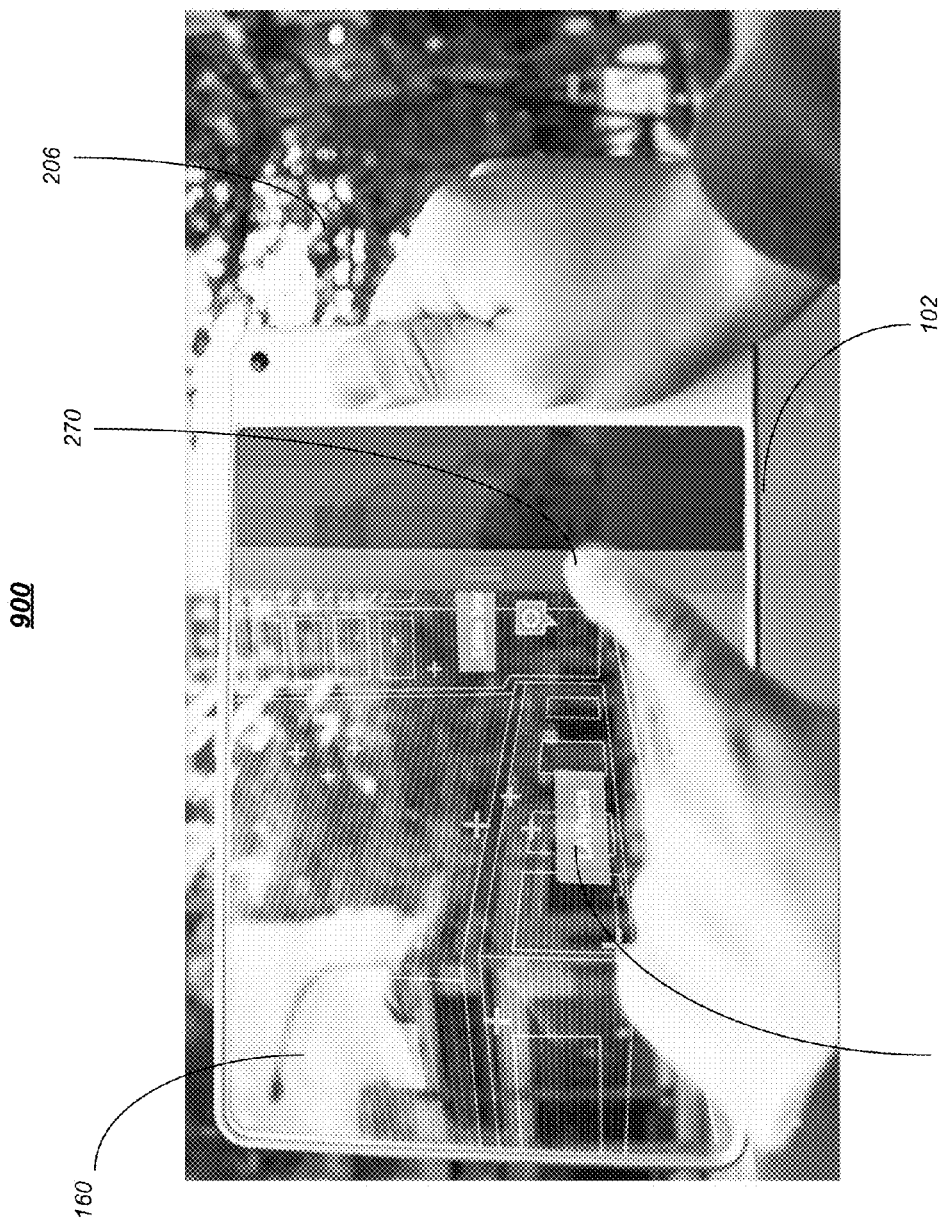
FIG. 9A illustrates one embodiment of a fourteenth system.
Figure 9B:
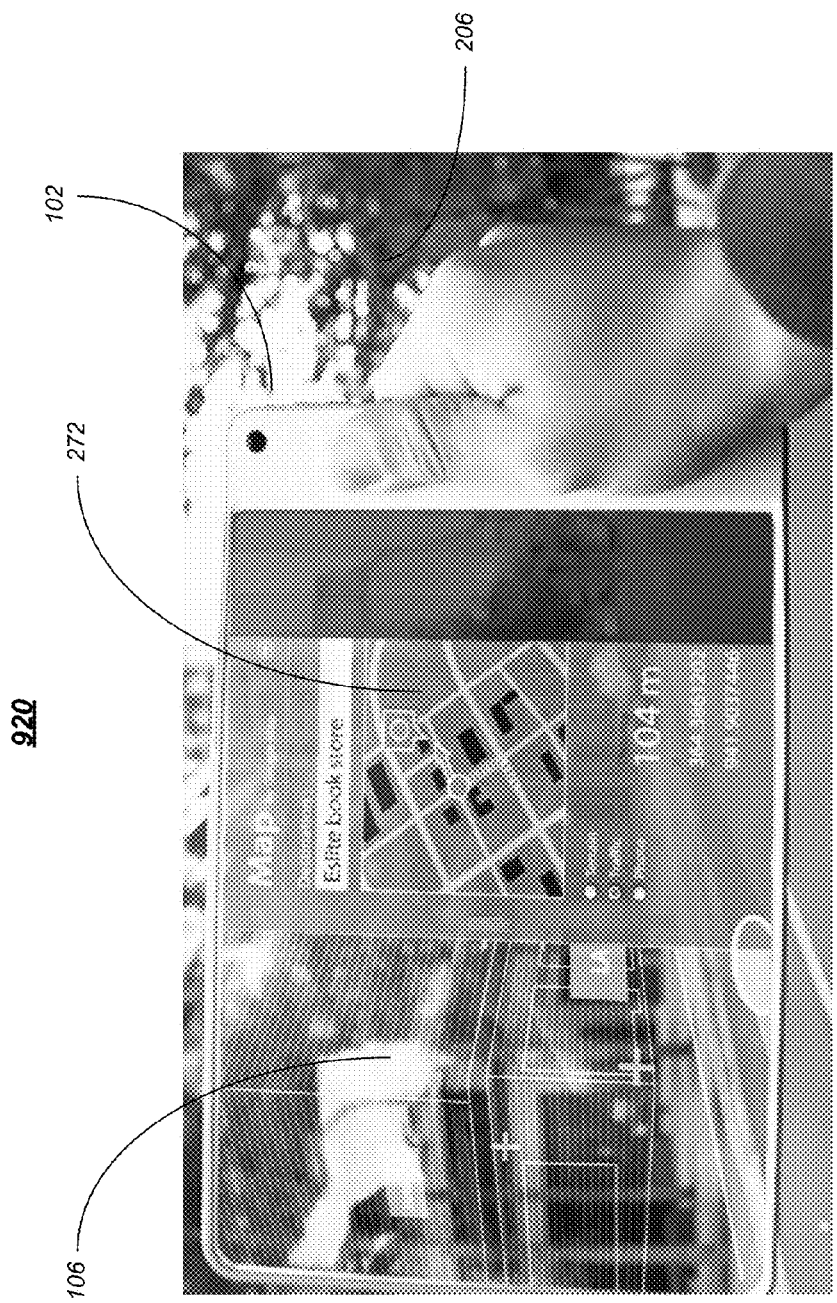
FIG. 9B illustrates one embodiment of a fifteenth system.

In various embodiments, the real world environment 206 may comprise an outdoor environment as shown in FIGS. 9A and 9B. FIGS. 9A and 9B illustrate examples of a computing device or system in different stages of operation 900 and 920 respectively. The computing devices 900 and 920 shown in FIGS. 9A and 9B may be the same or similar to computing devices 100 of FIG. 1, 200 of FIG. 2, 300 of FIG. 3, 400 of FIG. 4 and/or 500 of FIG. 5 and the user case scenarios shown in FIGS. 6A, 6B and 6C, FIGS. 7A, 7B and 7C and FIGS. 8A, 8B and 8C where like elements are similarly numbered. While not shown in FIGS. 9A and 9B, in various embodiments the computing devices 900 and 920 may be arranged to include an augmented reality module 108 as shown in FIG. 1.

In some embodiments, the augmented reality module 108 may be operative to detect one or more real world elements in proximity to the computing device, such as the buildings, linkiness and streets in the real world environment 206 of FIG. 9A. This detection may be based on a visual recognition system including camera 264 and/or through GPS, compass or other location information obtained from the one or more sensors 170. Augmented reality module 108 may be operative to identify one or more characteristics of the one or more real world elements, and display augmented reality overlay information or GUI elements 202 on the transparent display 106 based on the one or more characteristics. For example, in the embodiments shown in FIG. 9A, augmented reality module 108 may be operative to display street names, linkiness names, reviews and any other relevant information as overlay information 202 on the actual real world elements as visible through the transparent display 106.

In various embodiments, the one or more graphical user interface elements comprising augmented reality overlay information 202 may be related to the one or more elements in the real world environment. In some embodiments, responsive to user selection or input as shown at 270, additional information about particular real world elements may be revealed as shown in FIG. 9B. In some embodiments, the additional information may include directions, contact information, reviews, social networking information or any other suitable information. The embodiments are not limited int his respect.

Operations for various embodiments may be further described with reference to the following figures and accompanying examples. Some of the figures may include a logic flow. A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

FIG. 10 illustrates embodiments of a logic flow 1000. In various embodiments, the logic flow 1000 may be performed by various systems, nodes, and/or modules and may be implemented as hardware, software, and/or any combination thereof, as desired for a given set of design parameters or performance constraints. For example, the logic flow 1000 may be implemented by one or more of the computing devices described with respect to FIGS. 1-9B, a logic device, and/or logic comprising instructions, data, and/or code to be executed by a logic device or processor. For purposes of illustration, and not limitation, the logic flow 1000 is described with reference to FIGS. 1-9B. The embodiments are not limited in this context.

In various embodiments, as shown in FIG. 10, a location of a computing device associated with a real world environment may be determined at 1002. For example, computing device 100 may include a GPS module or other sensor 170 operative to determine a current location of computing device 100. In various embodiments, the determined location may be associated with a real world environment such as a longitude, latitude and altitude, a linkiness location or any other suitable location. One or more graphical user interface elements may be displayed on a transparent display of the computing device at 1004 in some embodiments. For example, the one or more GUI elements 202 may be displayed on display 106. In various embodiments, the one or more graphical user interface elements may be arranged based on one or more elements in the real world environment 1006. For example, the virtual representation of the bookshelf 240 may be arranged based on the dimensions and location of the walls, floor and ceiling of the real world environment 206 as shown in FIG. 6C. Other embodiments are described and claimed.

In some embodiments, the one or more elements in the real world environment may be visible through the transparent display and the one or more graphical user interface elements may comprise augmented reality overlay information related to the one or more elements in the real world environment. For example, the transparent display 106 of FIG. 9A may allow for a clear view of real world environment 206 and the overlay information 202 may be related to the element (e.g. buildings, streets, etc.) of the real world environment 206. In some embodiments, the one or more graphical user interface elements may be automatically updated based on movement of the computing device or based on movement of at least one of the one or more elements in the real world environment. For example, augmented reality module 108 may be operative to automatically adjust the overlay or virtual representations 240 based on movement of the device 100 or movement of any the real world elements in the real world environment 206.

In various embodiments, a virtual representation of one or more elements may be displayed in the real world environment visible through the transparent display. For example, the virtual chair 240 of FIGS. 7A, 7B and 7C may be displayed on display 106 such that the virtual chair 240 appears as though it is present in the real world environment 206 when viewed through the display 106. The embodiments are not limited in this respect.

One or more real world elements may be detected in proximity to the computing device in some embodiments. For example, camera 262 or 264 may be operative to detect one or more real world elements or the real world elements may be detected based on the known location of the computing device 100 and access to a database containing information about the real world elements. In various embodiments, one or more characteristics of the one or more real world elements may be identified. For example, a visual or optical recognition system may be operative to identify attributes or characteristics of real world elements, or the characteristics may be gathered from a database or from a remote source such a website. In some embodiments, augmented reality overlay information may be displayed on the transparent display based on the one or more characteristics as shown, for example, in FIG. 9A. Other embodiments are described and claimed.

Figure 11:
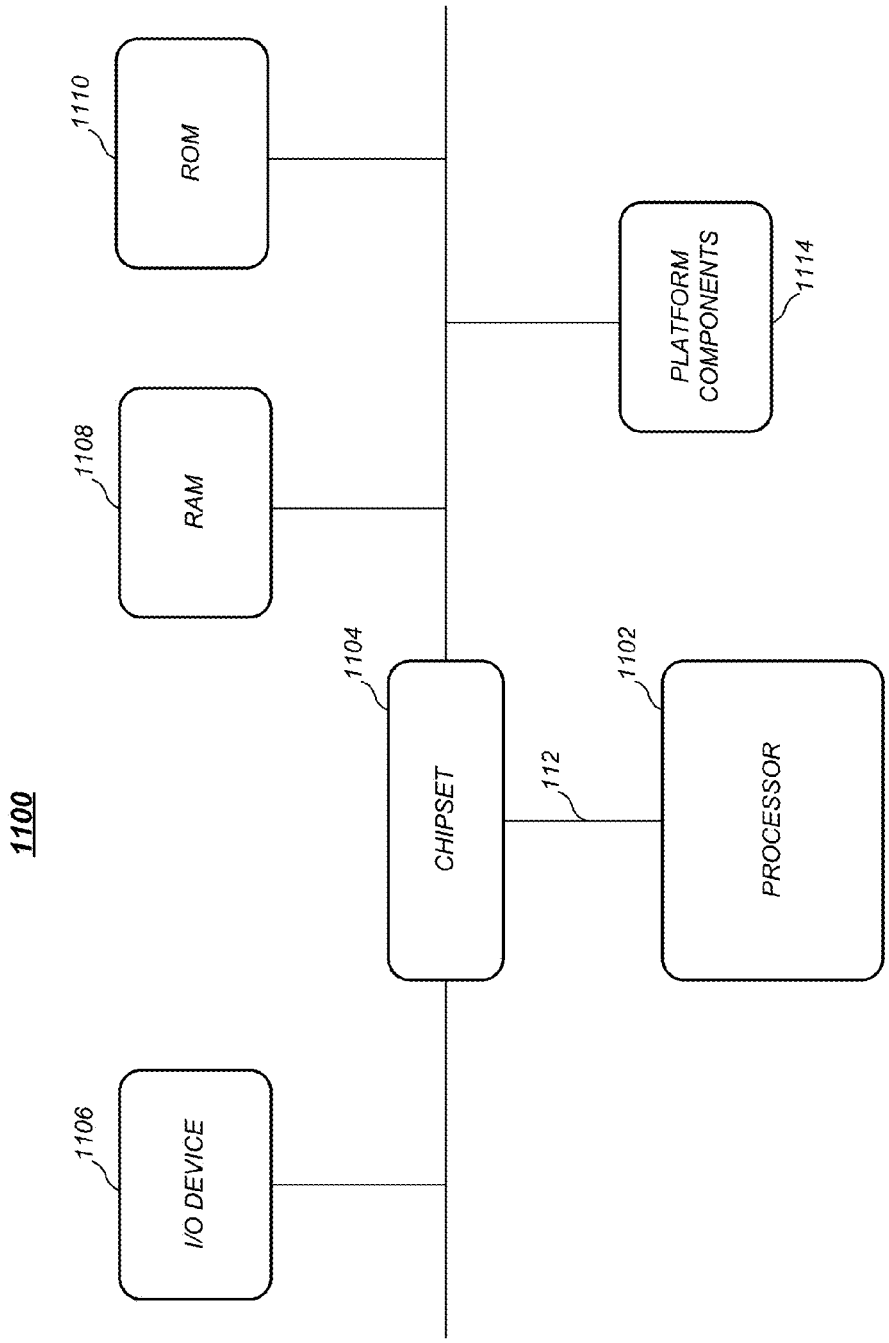
FIG. 11 illustrates one embodiment of a sixteenth system.

FIG. 11 is a diagram of an exemplary system embodiment. In particular, FIG. 11 is a diagram showing a system 1100, which may include various elements and may be the same or similar to the computing devices described with reference to FIGS. 1-17. For instance, FIG. 11 shows that system 1100 may include a processor 1102, a chipset 1104, an input/output (I/O) device 1106, a random access memory (RAM) (such as dynamic RAM (DRAM)) 1108, and a read only memory (ROM) 1110, and various platform components 1114 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a link 1112. Accordingly, link 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 1100 may include various interface circuits, such as an Ethernet interface and/or a Universal Serial Link (USB) interface, and/or the like. In some exemplary embodiments, the I/O device 1106 may comprise one or more input devices connected to interface circuits for entering data and commands into the system 1100. For example, the input devices may include a keyboard (physical or virtual/soft), mouse, touch screen, track pad, track ball, isopoint, a voice recognition system, and/or the like. Similarly, the I/O device 1106 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 1100 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data link speeds and other design, performance or cost constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine, processor or processor, may cause the machine, processor or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may comprise a non-transitory medium in some embodiments and may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language A storage medium as described herein may comprise an article of manufacture in some embodiments. In one embodiment, the storage medium may comprise any non-transitory computer readable medium or machine readable medium, such as an optical, magnetic or semiconductor storage. The storage medium may store various types of computer executable instructions, such as instructions to implement one or more logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

In one embodiment, a computing device may comprise an enclosure comprising a display portion and a component portion, the display portion arranged to support a transparent display and the component portion arranged to support a processor and an augmented reality module operative on the processor to display one or more graphical user interface elements on the transparent display and to arrange the one or more graphical user interface elements based on one or more elements in a real world environment in proximity to the computing device.

In another embodiment, the one or more elements in the real world environment may be visible through the transparent display.

Alternatively, or in addition, in a further embodiment the one or more graphical user interface elements may comprise augmented reality overlay information related to the one or more elements in the real world environment.

Alternatively, or in addition, in a further embodiment, the transparent display may be framed by the display portion of the enclosure and arranged to allow for a view through the computing device.

Alternatively, or in addition, in a further embodiment, the component portion may be curved or angled with respect to the display portion.

Alternatively, or in addition, in a further embodiment, the augmented reality module may be operative to automatically update the one or more graphical user interface elements based on movement of the computing device.

Alternatively, or in addition, in a further embodiment, the augmented reality module may be operative to automatically update the one or more graphical user interface elements based on movement of at least one of the one or more elements in the real world environment.

Alternatively, or in addition, in a further embodiment, the one or more graphical user interface elements may comprise a virtual representation of one or more elements of a real world environment and the augmented reality module may be operative to display the virtual representation of the one or more elements in the real world environment visible through the transparent display.

Alternatively, or in addition, in a further embodiment, the augmented reality module may be operative to detect one or more real world elements in proximity to the computing device, identify one or more characteristics of the one or more real world elements, and display augmented reality overlay information on the transparent display based on at least one of the one or more characteristics.

Alternatively, or in addition, in a further embodiment, the display may comprise a transparent light-emitting diode display or a transparent liquid crystal display and/or a touch-sensitive display communicatively coupled to the processor.

Alternatively, or in addition, in a further embodiment one or more integrated input devices may be arranged on the component portion of the enclosure.

Alternatively, or in addition, a further embodiment may include or comprise one or more sensors comprising one or more of a camera, accelerometer, proximity sensor, light sensor, compass or global positioning system (GPS).

Some embodiments may comprise a system according to any of the above described embodiments and an audio device communicatively coupled to the processor.

Various embodiments may comprise a system according to any of the above described embodiments and one or more wireless transceivers operative to enable wireless communications for the computing device using one or more wireless communication protocols.

In one embodiments, an apparatus may comprise a transparent touch sensitive display, a processor, and a memory unit communicatively coupled to the processor, the memory unit arranged to store an augmented reality module operative on the processor, the augmented reality module operative to display one or more graphical user interface elements on the transparent display and to arrange the one or more graphical user interface elements based on one or more elements in a real world environment in proximity to the computing device.

Alternatively, or in addition, in a further embodiment, the one or more elements in the real world environment may be visible through the transparent display and the one or more graphical user interface elements may comprise augmented reality overlay information related to the one or more elements in the real world environment.

Alternatively, or in addition, in a further embodiment, the transparent display may be framed by a display portion of an enclosure arranged to allow for a view through the computing device and the processor may be supported by a component portion of the enclosure.

Alternatively, or in addition, in a further embodiment, the component portion may be curved or angled with respect to the display portion to create a handle for the apparatus.

Alternatively, or in addition, in a further embodiment, the augmented reality module may be operative to automatically update the one or more graphical user interface elements based on movement of the apparatus.

Alternatively, or in addition, in a further embodiment, the augmented reality module may be operative to automatically update the one or more graphical user interface elements based on movement of at least one of the one or more elements in the real world environment.

Alternatively, or in addition, in a further embodiment, the one or more graphical user interface elements may comprise a virtual representation of one or more elements of a real world environment and the augmented reality module may be operative to display the virtual representation of the one or more elements in the real world environment visible through the transparent display.

Alternatively, or in addition, in a further embodiment, the augmented reality module may be operative to detect one or more real world elements in proximity to the computing device, identify one or more characteristics of the one or more real world elements, and display augmented reality overlay information on the transparent display based on at least one of the one or more characteristics.

Some embodiments may comprise a system according to any of the above described embodiments and an audio device communicatively coupled to the processor.

In one embodiment, a computer-implemented method may comprise determining a location of a computing device, the location associated with a real world environment, displaying one or more graphical user interface elements on a transparent display of the computing device, and arranging the one or more graphical user interface elements based on one or more elements in the real world environment.

Alternatively, or in addition, in a further embodiment, the one or more elements in the real world environment may be visible through the transparent display and the one or more graphical user interface elements may comprise augmented reality overlay information related to the one or more elements in the real world environment.

Alternatively, or in addition, in a further embodiment the method may comprise automatically updating the one or more graphical user interface elements based on movement of the computing device.

Alternatively, or in addition, in a further embodiment the method may comprise automatically updating the one or more graphical user interface elements based on movement of at least one of the one or more elements in the real world environment.

Alternatively, or in addition, in a further embodiment the method may comprise displaying a virtual representation of one or more elements in the real world environment visible through the transparent display.

Alternatively, or in addition, in a further embodiment the method may comprise detecting one or more real world elements in proximity to the computing device, identifying one or more characteristics of the one or more real world elements, and displaying augmented reality overlay information on the transparent display based on the one or more characteristics.

Some embodiments may comprise at least one machine readable medium comprising a plurality of instructions that in response to being executed on a computing device cause the computing device to carry out a method according to any of the embodiments described herein.

Various embodiments may comprise an apparatus comprising means for performing the method of any of the embodiments described herein.

Some embodiments may comprise a tablet computing device arranged to perform the method of any of the embodiments described herein. Other embodiments are described and claimed.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
an enclosure comprising a display portion and a component portion, the display portion arranged to support a transparent display and the component portion arranged to support a processor; and
an augmented reality module operative on the processor to:
display one or more graphical user interface elements on the transparent display and to arrange the one or more graphical user interface elements based on a plurality of elements in a real world environment in proximity to the computing device;
receive a selection of a first one of the plurality of elements in the real world environment on the display portion of the enclosure;
convert the first one of the plurality of elements selected in the real world environment to a virtual representation;
automatically adjust one or more characteristics of the virtual representation, the one or more characteristics comprising at least a size of the virtual representation adjusted based in part on at least one of a size, dimension, and orientation of a second one of the plurality of elements in the real world environment; and
display the adjusted virtual representation as an overlay on the second one of the plurality of elements on the transparent display.

2. The computing device of claim 1, the at least one of the plurality of elements in the real world environment visible through the transparent display.

3. The computing device of claim 1, the one or more graphical user interface elements comprising augmented reality overlay information related to the plurality of elements in the real world environment.

4. The computing device of claim 1, the transparent display framed by the display portion of the enclosure and arranged to allow for a view through the computing device.

5. The computing device of claim 1, the component portion curved or angled with respect to the display portion.

6. The computing device of claim 1, the augmented reality module operative to automatically update the one or more graphical user interface elements based on movement of the computing device.

7. The computing device of claim 1, the augmented reality module operative to automatically update the one or more graphical user interface elements based on movement of at least one of the plurality of elements in the real world environment.

8. The computing device of claim 1, the augmented reality module operative to detect one or more real world elements in proximity to the computing device, identify one or more characteristics of the one or more real world elements, and display augmented reality overlay information on the transparent display based on at least one of the one or more characteristics.

9. The computing device of claim 1, the display comprising a transparent light-emitting diode display or a transparent liquid crystal display.

10. The computing device of claim 1, the display comprising a touch-sensitive display communicatively coupled to the processor.

11. The computing device of claim 1, comprising:
one or more integrated input devices arranged on the enclosure.

12. The computing device of claim 1, comprising:
one or more sensors comprising one or more of a camera, accelerometer, proximity sensor, light sensor, compass or global positioning system (GPS).

13. An apparatus, comprising:
a transparent touch sensitive display;
a processor; and
a memory unit communicatively coupled to the processor, the memory unit arranged to store an augmented reality module operative on the processor, the augmented reality module operative to:
display one or more graphical user interface elements on the transparent display and to arrange the one or more graphical user interface elements based on a plurality of elements in a real world environment in proximity to the computing device;
receive a selection of a first one of the plurality of elements in the real world environment on the display portion of the enclosure;
convert the first one of the plurality of elements in the real world environment to a virtual representation;
automatically adjust one or more characteristics of the virtual representation, the one or more characteristics comprising at least a size of the virtual representation adjusted based in part on at least one of a size, dimension, and orientation of a second one of the plurality of elements in the real world environment;

and
    display the adjusted virtual representation as an overlay on the second one of the plurality of elements on the transparent display.

14. The apparatus of claim 13, the plurality of elements in the real world environment visible through the transparent display and the one or more graphical user interface elements comprising augmented reality overlay information related to at least one of the plurality of elements in the real world environment.

15. The apparatus of claim 13, the transparent display framed by a display portion of an enclosure arranged to allow for a view through the computing device and the processor supported by a component portion of the enclosure.

16. The apparatus of claim 15 the component portion curved or angled with respect to the display portion to create a handle for the apparatus.

17. The apparatus of claim 13, the augmented reality module operative to automatically update the one or more graphical user interface elements based on movement of the apparatus.

18. The apparatus of claim 13, the augmented reality module operative to automatically update the one or more graphical user interface elements based on movement of at least one of the plurality of elements in the real world environment.

19. The apparatus of claim 13, the augmented reality module operative to detect one or more real world elements in proximity to the computing device, identify one or more characteristics of the one or more real world elements, and display augmented reality overlay information on the transparent display based on at least one of the one or more characteristics.

20. A computer-implemented method, comprising:
    determining a location of a computing device, the location associated with a real world environment;
    displaying one or more graphical user interface elements on a transparent display of the computing device; and
    arranging the one or more graphical user interface elements based on a plurality of elements in a real world environment;
    receiving a selection of a first one of the plurality of elements in the real world environment on the display portion of the enclosure;
    converting the first one of the plurality of elements in the real world environment to a virtual representation;
    automatically adjusting one or more characteristics of the virtual representation, the one or more characteristics comprising at least a size of the virtual representation adjusted based in part on at least one of a size, dimension, and orientation of a second one of the plurality of elements in the real world environment; and
    displaying the adjusted virtual representation as an overlay on the second one of the plurality of elements on the transparent display.

21. The computer-implemented method of claim 20, the plurality of elements in the real world environment visible through the transparent display and the one or more graphical user interface elements comprising augmented reality overlay information related to at least one of the plurality of elements in the real world environment.

22. The computer implemented method of claim 20, comprising:
    automatically updating the one or more graphical user interface elements based on movement of the computing device.

23. The computer implemented method of claim 20, comprising:
    automatically updating the one or more graphical user interface elements based on movement of at least one of the plurality of elements in the real world environment.

24. The computer implemented method of claim 20, comprising:
    detecting one or more real world elements in proximity to the computing device;
    identifying one or more characteristics of the one or more real world elements; and
    displaying augmented reality overlay information on the transparent display based on the one or more characteristics.

* * * * *